(12) United States Patent
Bass et al.

(10) Patent No.: US 11,443,859 B2
(45) Date of Patent: Sep. 13, 2022

(54) NATURAL CIRCULATION HEAT REMOVAL SYSTEM FOR A NUCLEAR REACTOR WITH PILE STRUCTURE

(71) Applicant: GE-Hitachi Nuclear Energy Americas LLC, Wilmington, NC (US)

(72) Inventors: Derek Bass, Wilimington, NC (US); Eric Paul Loewen, Wilmington, NC (US); Haaken Lysne, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 0 days.

(21) Appl. No.: 17/134,894

(22) Filed: Dec. 28, 2020

(65) Prior Publication Data

US 2022/0208402 A1 Jun. 30, 2022

(51) Int. Cl.
*G21C 15/18* (2006.01)
*G21C 15/253* (2006.01)

(52) U.S. Cl.
CPC .......... *G21C 15/18* (2013.01); *G21C 15/253* (2013.01)

(58) Field of Classification Search
CPC ...... G21C 15/18; G21C 11/02; G21C 11/086; G21C 9/02; G21C 9/04; G21F 9/04; G21F 9/24; F24F 7/10; F24F 13/082; F02C 7/055; F02C 7/05
See application file for complete search history.

(56) References Cited

U.S. PATENT DOCUMENTS 2,180,945 A * 11/1939 Morey ...................... E04B 9/02
454/297
3,429,103 A * 2/1969 Taylor ..................... C04B 41/85
95/142

(Continued)

FOREIGN PATENT DOCUMENTS

JP 2000-056071 A 2/2000

OTHER PUBLICATIONS

Hunsbedt, A.; GE Nuclear Energy, "Experiments and Analyses in Support of the US ALMR Thermal Hydraulic Design," in *IAEA International Working Group on Fast Reactors Specialist Meeting on Evaluation of Decay Heat Removal by Natural Convection in Fast Reactors*, Oarai, Japan, 1993.

(Continued)

*Primary Examiner* — Jack W Keith
*Assistant Examiner* — Joshua C Devorkin
(74) *Attorney, Agent, or Firm* — Harness, Dickey & Pierce, P.L.C.

(57) ABSTRACT

A nuclear plant including a nuclear reactor and a natural circulation air cooling system configured to provide cooling of the nuclear reactor based on circulating ambient air from an air inlet opening to absorb nuclear reactor rejected heat through an outlet air opening, due to natural circulation of said ambient air induced by the ambient air absorbing said rejected heat, may further include a pile structure covering at least one opening of the air inlet opening or the air outlet opening. The pile structure may include a pile of packing objects covering the at least one opening, such that the at least one opening is obscured from direct exposure to the ambient environment by the pile of the packing objects.

18 Claims, 8 Drawing Sheets

(56) References Cited

U.S. PATENT DOCUMENTS

| | | | | |
|---|---|---|---|---|
| 4,244,153 | A | * | 1/1981 | Schwarzer ............ G21C 13/00 376/273 |
| 4,959,193 | A | | 9/1990 | Hunsbedt et al. |
| 5,043,135 | A | * | 8/1991 | Hunsbedt ............... G21C 15/18 376/299 |
| 5,406,602 | A | | 4/1995 | Hunsbedt et al. |
| 5,499,277 | A | | 3/1996 | Hunsbedt |
| 7,522,693 | B2 | | 4/2009 | Eoh et al. |
| 9,177,675 | B2 | | 11/2015 | Vereb et al. |

OTHER PUBLICATIONS

R. C. Soucy and R. Amar, "Testing and Analysis of Passive Decay Heat Removal in Liquid-Metal Systems," in *Transactions of the American Nuclear Society Winter Meeting* vol. 62, Washington D.C., 1990.

R. Johnson and R. Soucy, "ETEC Testing of Passive Decay Heat Removal Systems," in *4th International Topical Meeting on Thermal Hydrauiics NURETH-4*, Karlsruhe, 1989.

J. C. Guzek, R. L. Stover, D. L. Polzin and S. Guttenberg, "Analysis of the Natural Convective Air Cooling Tests in the FFTF Interim Decay Storage Vessel," in *Proceedings of ASME-JSME Thermal Engineering Joint Conference* vol. III, Honolulu, 1987.

J. Heineman, "Experimental and Analytical Studies of a Passive Shutdown Heat Removal System for LMRs," in *Proceedings of the International Topical Meeting on Safety of Next Generation Power Reactors* , Seattle, 1988.

Hunsbedt, A.; Magee, P. M.; GE Nuclear Energy, "Design and Performance of the PRISM Natural Convection Decay Heat Removal System," in *Proceedings of International Topical Meeting on Safety of Next Generation Power Reactors*, Seattle, 1988.

International Search Report and Written Opinion dated Apr. 22, 2022 in International Application No. PCT/US2021/065065.

* cited by examiner

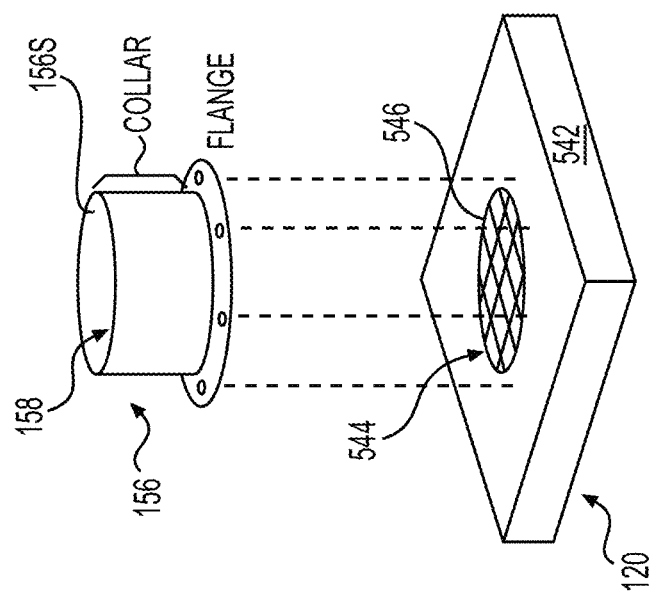
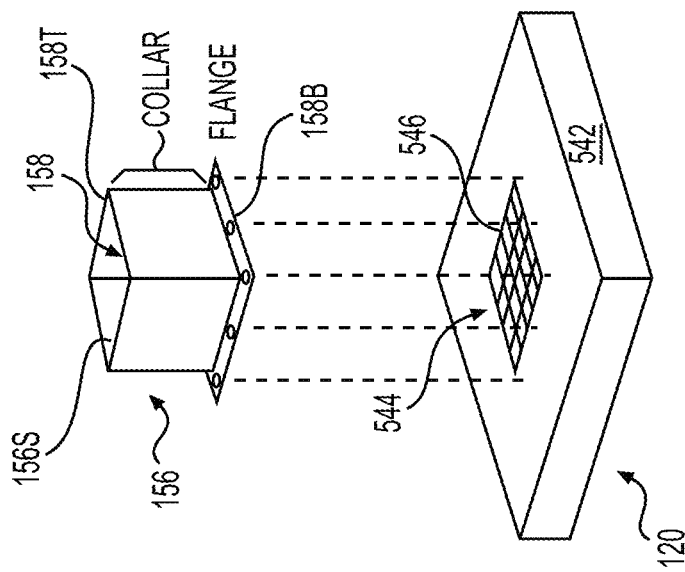

NATURAL CIRCULATION HEAT REMOVAL SYSTEM FOR A NUCLEAR REACTOR WITH PILE STRUCTURE

BACKGROUND

Field

Example embodiments described herein relate in general to nuclear reactors and in particular to providing a natural circulation heat removal system to remove heat from a nuclear reactor with improved protection of an air inlet and/or outlet of said natural circulation heat removal system by providing robust pile structure to cover the air inlet and/or air outlet to provide improved protection and robustness of the air inlet and/or air outlet in order to secure heat removal from the nuclear reactor.

Description of Related Art

Nuclear reactors may be configured to be cooled via heat transfer to one or more coolant fluids circulated in or near the nuclear reactor. Such heat transfer may be referred to herein as heat rejection by the nuclear reactor. Various coolant fluids may be utilized to remove heat from the nuclear reactor.

In some nuclear plants, a nuclear reactor includes a heat removal system, also referred to herein as a cooling system and/or as simply "containment," for managing heat rejection by the nuclear reactor by facilitating circulation of a coolant fluid, such as ambient air, to a point in the nuclear reactor where the coolant fluid absorbs heat rejected by the nuclear reactor, and the heated coolant fluid is then circulated to a heat return, or heat sink, where the heated coolant fluid may be cooled to release the absorbed heat. In some nuclear plants, the containment system may be impacted by heat rejection that exceeds the heat transfer capabilities of a power coolant loop that is used to induce work, for example to generate electricity. Accordingly, the containment system may utilize cooling to manage containment system temperature.

SUMMARY

According to some example embodiments, a nuclear plant may include a nuclear reactor. The nuclear plant may include a natural circulation air cooling system defining an air inlet opening, an air outlet opening, and one or more conduits extending in thermal communication with the nuclear reactor between the air inlet opening and the air outlet opening, such that the natural circulation air cooling system is configured to circulate ambient air from an ambient environment, through the air inlet opening, and into the one or more conduits, and circulate the ambient air from the one or more conduits, through the air outlet opening, and into the ambient environment, based on the ambient air in the one or more conduits absorbing heat rejected from the nuclear reactor such that a density of the ambient air absorbing the heat in the one or more conduits is reduced in relation to ambient air circulated into the one or more conduits from the ambient environment. The nuclear plant may include a pile structure covering at least one opening of the air inlet opening or the air outlet opening, the pile structure including a pile of packing objects covering the at least one opening, such that the at least one opening is obscured from direct exposure to the ambient environment by the pile of the packing objects.

The pile of the packing objects may include a three-dimensional lattice of the packing objects.

The pile structure may further include a channel structure coupled to and laterally surrounding the at least one opening and extending vertically upwards from the at least one opening into an interior of the pile structure, the channel structure having a sidewall defining an interior channel extending vertically from a bottom opening that is proximate to the at least one opening to a top opening that is distal to the at least one opening, such that the channel structure is configured to direct air to flow between the at least one opening and the top opening through the interior channel, and inhibit lateral fluid flow to the at least one opening from an exterior of the channel structure.

The channel structure may include a lower solid portion defining a lower portion of the interior channel, and an upper perforated portion defining an upper portion of the interior channel. The upper perforated portion may include one or more perforations extending laterally through a thickness of the sidewall of the channel structure, and the lower solid portion does not include any perforations extending laterally through the thickness of the sidewall of the channel structure, such that the channel structure is configured to direct air to flow laterally between the upper portion of the interior channel and the exterior of the channel structure, and inhibit lateral fluid flow to the lower portion of the interior channel from the exterior of the channel structure.

The packing objects may be associated with a particular angle of repose, and the pile of the packing objects may have an angle of elevation that is equal to or less than about 90% of the particular angle of repose.

The pile structure may include a net structure extending over at least a portion of the packing objects.

The pile structure may include a first sub-pile of the packing objects that covers the at least one opening. The net structure may cover the first sub-pile. The pile structure may further include a second sub-pile of the packing objects that covers the first sub-pile and the net structure, such that the net structure is located between the first sub-pile and the second sub-pile.

The pile of packing objects may have a packing density that is greater than or equal to about 750 to 1,300 kg/m$^3$.

A maximum cumulative volume of interstitial spacing between adjacent packing objects in the pile of the packing objects may be equal to or less than about 60% of a total volume of the pile structure.

A maximum interstitial spacing between any adjacent packing objects in the pile of the packing objects may be equal to or less than about 12 inches.

The pile structure may be configured such that a pressure difference along a given length of a given air flow conduit between the at least one opening and the ambient environment through the pile structure is equal to or less than about 2 inches of water gauge per foot of distance through the given air flow conduit.

The packing objects may include at least one of a dolos structure, a KOLOS structure, a tetrapod structure, a riprap structure, or a concrete structure.

The nuclear plant may further include a curb structure at least partially laterally surrounding the pile structure, the curb structure having a vertical height of about 6 inches to about 1 foot, the curb structure configured to mitigate lateral particulate material entry into the pile of the packing objects.

The pile structure may further include one or more of activated alumina (Al2O3), activated charcoal, organic wax, plastic, a polymer matrix, or a molten salt.

The nuclear plant may further include a first pile structure covering the air inlet opening, the first pile structure including a first pile of first packing objects covering the air inlet opening, such that the air inlet opening is obscured from direct exposure to the ambient environment by the first pile of the first packing objects. The nuclear plant may further include a second pile structure covering the air outlet opening, the second pile structure including a second pile of second packing objects covering the air outlet opening, such that the air outlet opening is obscured from direct exposure to the ambient environment by the second pile of the second packing objects. The pile structure may be one of the first pile structure or the second pile structure, such that the pile of the packing objects is one of the first pile of the first packing objects or the second pile of the second packing objects.

A maximum vertical elevation of the second pile of the second packing objects may be greater than a maximum vertical elevation of the first pile of the first packing objects.

The pile structure may cover both the air inlet opening and the air outlet opening, such that both the air inlet opening and the air outlet opening are obscured from direct exposure to the ambient environment by the pile of packing objects.

The pile structure may include a wall structure, the wall structure at least partially located within the pile of the packing objects and at least partially obscured from direct exposure to the ambient environment by the packing objects, the wall structure located laterally between the air inlet opening and the air outlet opening such that opposite sidewalls of the wall structure are proximate to separate, respective openings of the air inlet opening or the air outlet opening.

According to some example embodiments, a system may include a heat source and/or structure located at least partially below a local ground surface elevation, the heat source and/or structure configured to generate heat at a location that is below the local ground surface elevation. The system may include an air cooling system defining an air inlet opening, an air outlet opening, and one or more conduits extending in thermal communication with the heat source and/or structure, at the location that is below the local ground surface elevation where the heat is generated, between the air inlet opening and the air outlet opening, such that the air cooling system is configured to circulate ambient air from an ambient environment, through the air inlet opening, and into the one or more conduits, and circulate the ambient air from the one or more conduits, through the air outlet opening, and into the ambient environment, based on the ambient air in the one or more conduits absorbing heat rejected from the heat source and/or structure. The system may include a pile structure covering at least one opening of the air inlet opening or the air outlet opening, the pile structure including a pile of packing objects covering the at least one opening, such that the at least one opening is obscured from direct exposure to the ambient environment by the pile of the packing objects.

According to some example embodiments, a method may include assembling a pile of packing objects on at least one opening of an air cooling system of a system that includes a heat source and/or structure located at least partially below a local ground surface elevation. The heat source and/or structure may be configured to generate heat at a location that is below the local ground surface elevation. The assembled pile of packing objects may establish a pile structure covering the at least one opening, such that the at least one opening is obscured from direct exposure to an ambient environment by the pile of the packing objects. The air cooling system may be configured to remove the heat from the heat source and/or structure at the location that is below the local ground surface elevation. The cooling system may define an air inlet opening, an air outlet opening, and one or more conduits extending in thermal communication with the heat source and/or structure at the location that is below the local ground surface elevation between the air inlet opening and the air outlet opening, such that the air cooling system is configured to circulate ambient air from the ambient environment, through the air inlet opening, and into the one or more conduits, and circulate the ambient air from the one or more conduits, through the air outlet opening, and into the ambient environment, based on the ambient air in the one or more conduits absorbing heat rejected from the heat source and/or structure at the location that is below the local ground surface elevation. The at least one opening of the cooling system may be at least one of the air inlet opening or the air outlet opening.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIGS. 5A and 5B are perspective exploded views of a channel structure coupled to an opening within a pile structure, according to some example embodiments.

DETAILED DESCRIPTION

Figure 1:
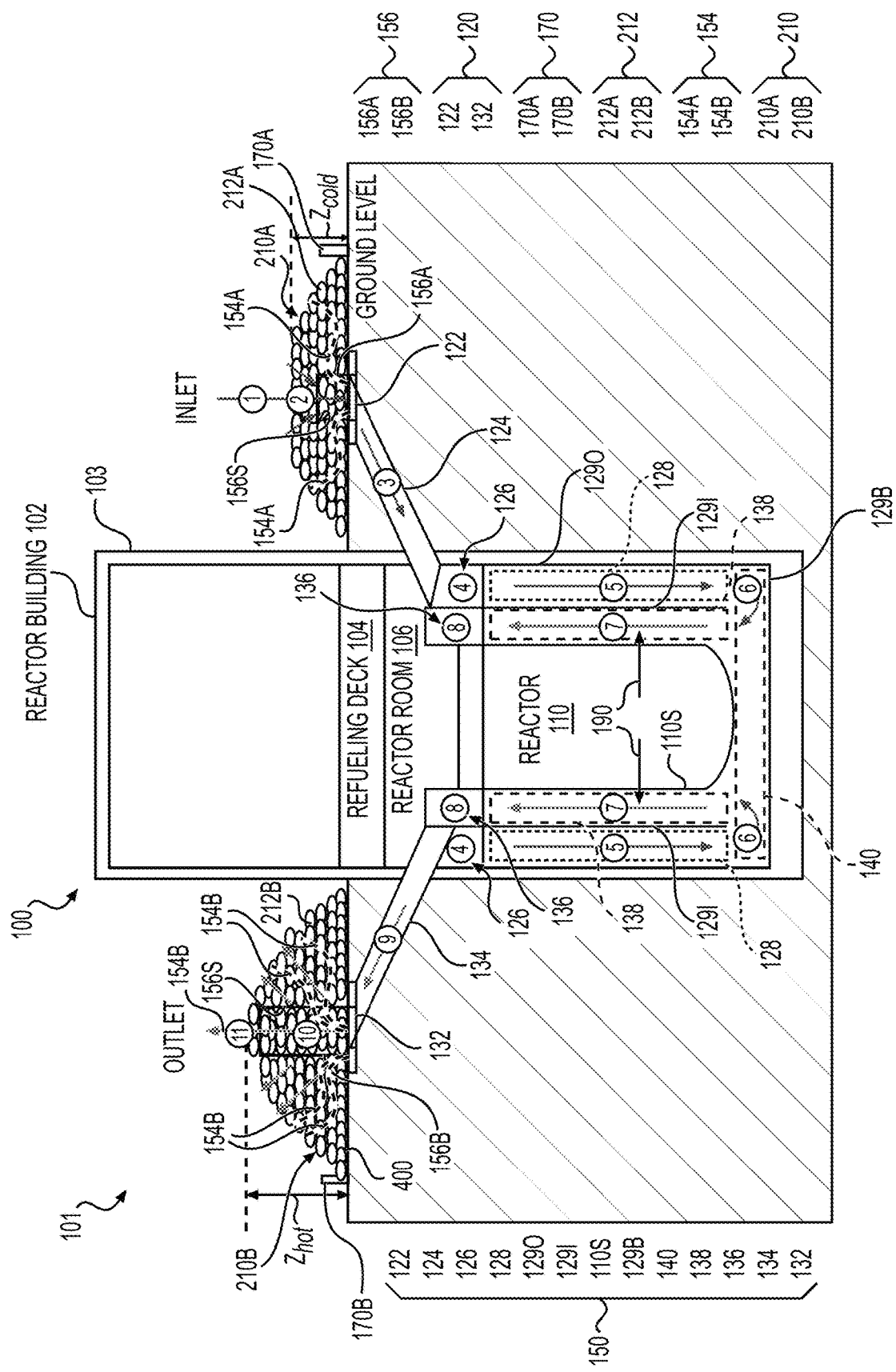
FIG. 1 is a cross-sectional side view of a nuclear plant that includes a natural circulation heat removal system and pile structures, according to some example embodiments.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

The present disclosure relates to nuclear plants that include a cooling system configured to remove heat from a nuclear reactor of the nuclear plant, and thus provide cooling of the nuclear reactor. Such a cooling system may include, but is not limited to, an air cooling system. An air cooling system may include, but is not limited to, a natural circulation air cooling system for providing cooling of (e.g., remove heat from) a nuclear reactor in a nuclear plant via a passive, or natural circulation cooling capability, (e.g., a cooling capability that is not driven by energy consumption, such as operation of a flow generator device, e.g., a pump, fan compressor, blower, etc., to induce, control, and/or maintain a flow of coolant fluid) that provides cooling via circulating ambient air as a coolant fluid through the system to absorb heat rejected by the nuclear reactor and remove said absorbed heat from the nuclear plant, and replace the heated air with cooler (e.g., ambient-temperature) ambient air newly-drawn from the ambient environment based on changing air density of the air due to absorbing said heat to drive the circulation. It will be understood that an air cooling system according to some example embodiments may include one or more flow generator devices (e.g., a pump, fan, compressor, blower, etc.) that are configured to induce, control, and/or maintain a flow of air through at least a portion of the air cooling system.

The present disclosure further relates to one or more pile structures that overlay, or cover, at least one opening of an air inlet opening of the natural circulation air cooling system, through which "cold" (e.g., ambient-temperature) ambient air is drawn from the ambient environment into the natural circulation air cooling system, or an air outlet opening of the natural circulation air cooling system, through which "hot" air that has absorbed heat from the nuclear reactor passes to exit the system and thus discharge the absorbed heat into the ambient environment. The pile structure includes a pile of packing objects overlaying (e.g., covering) the at least one opening, such that the at least one opening is obscured from direct exposure to the ambient environment by the pile of the packing objects. Direct exposure may refer to exposure of the at least one opening along a direct line of sight (e.g., straight line) to the ambient environment that is external to the pile structure.

In some example embodiments, a pile structure covering at least one opening of the natural circulation air cooling system provides improved protection and robustness to the natural circulation air cooling system based on defining multiple air flow conduits between the at least one opening and the ambient environment (extending through interstitial spaces between packing objects in the pile structure). The pile structure may be configured to be collectively resistant to the air flow conduits being collectively significantly affected by destructive events (e.g., severe weather, earthquakes, aircraft crashes near and/or into the nuclear plant, deliberate sabotage attempts, etc.), such that the pile structure is configured to mitigate the effect that such destructive events might have on air flow into and/or out of the natural circulation air cooling system may be reduced, and thus mitigate the effect that such destructive events might have on cooling of the nuclear reactor.

A pile structure covering at least one opening of the air inlet opening or the air outlet opening may including a pile of packing objects (also referred to herein as packing media) covering the at least one opening, such that the at least one opening is obscured from direct exposure to the ambient environment by the pile of the packing objects.

The pile structure may, in addition to obscuring (e.g., obstructing) the opening from direct exposure to the ambient environment, divide the collective air flow conduits between the opening and the ambient environment into multiple conduits extending through interstitial spaces between the packing objects in the pile structure. The individual air flow conduits are individually smaller in cross-sectional flow area than the cross-sectional flow area of the opening, but the air flow conduits may collectively have the same or greater collective cross-sectional flow area than the cross-sectional flow area of the opening. The interstitial spaces between adjacent packing objects in the pile structure may be sufficiently small enough to frustrate and/or mitigate the ability of a human and/or mobile device (e.g., remotely-operated or autonomous) from passing through the interstitial spaces to directly access the opening covered by the pile structure. As a result, direct access and/or exposure to the at least one opening of the natural circulation air cooling system may be limited by the pile structure. Accordingly, it will be understood that the improved protection to the nuclear plant that is provided by one or more pile structures covering one or more openings of the natural circulation air cooling system of the nuclear plant may improve security of the natural circulation air cooling system from deliberate attempts to affect the cooling of the nuclear reactor via entering the natural circulation air cooling system via the one or more openings.

In some example embodiments, the pile structure may be configured to absorb direct impacts and/or destructive events (e.g., an aircraft or other vehicle impacting the pile structure, an explosion at an outer edge and/or within an interstitial space of the pile structure, an earthquake acting on the packing objects of the pile structure) without significantly affecting the collective, or aggregate cross-sectional flow area of the air flow conduits defined through the interstitial spaces between packing objects in the pile structure, or without at least a portion of the air flow conduits, representing a collective cross-sectional flow area that equals the cross-sectional flow area of the covered opening, being obstructed. As a result, the effect of the destructive events on the air flow capability of the natural circulation air cooling system via the at least one opening, and thus upon the cooling of the nuclear reactor, may be reduced and/or mitigated. Thus, protection of the nuclear reactor against the effects of destructive events is improved.

In some example embodiments, the pile structure covering an opening of the natural circulation air cooling system provides a relatively large quantity of various air flow paths between the opening and the ambient environment via the interstitial spaces between packing objects in the pile structure. As noted above the air flow paths may have a collective cross-flow area that may be greater than the cross-sectional flow area of the opening, and the air flow paths may further extend from the opening to multiple, various locations at the outer boundary of the pile structure. As a result, the pile structure is configured to redirect air flow between the opening and the ambient environment to flow through some flow paths when other flow paths become blocked, or obstructed (e.g., due to impact of an object with the pile structure, due to shifts in the packing objects due to a destructive event, due to flooding, some combination thereof, or the like). As a result, the pile structure improves the robustness and protection of the covered opening of the natural circulation air cooling system to ensuring air flow between said opening and the ambient environment. As a result, the pile structure reduces the risk that a destructive event may constrict the flow of ambient air between the opening and the ambient environment to be less than required to maintain cooling capability of the natural circulation air cooling system, thereby reducing and/or mitigating the risk of any destructive event to constrict cooling of the nuclear reactor.

Additionally, because the pile structure comprises a "pile" of packing objects, the pile structure may have relatively improved resilience against being deformed by destructive events (e.g., earthquake, flooding, fire, etc.). Individual packing objects may have a relatively large mass (e.g., ½ metric ton each), such that the packing objects are resistant to being physically moved or displaced in relation to the pile structures. Additionally, because the packing objects are arranged in a pile, destructive events such as impacts of objects with the pile structure might shift the arrangement of packing objects in the pile, but such shifts may have a reduced effect upon the collective air flow conduits through the pile structure (e.g., some flow paths may become obstructed, but other flow paths may be unaffected, and new flow paths may be opened due to the shifting). Thus, the pile structure may provide improved resistance of the natural circulation air cooling system to restriction of natural air circulation through the natural circulation air cooling system.

Additionally, the sheer mass of the pile and packing objects thereof may frustrate attempts to physically move, or displace, sufficient quantities of the packing objects to expose a covered opening of the natural circulation air cooling system and/or to sufficiently obstruct the multiple flow paths through the pile structure to constrict air flow there though. As a result, protection of the natural circulation air cooling system, and thus of the nuclear reactor and the nuclear plant, is improved.

Based on providing a pile structure that divides the flow path between an overlaid opening and the ambient environment into a relatively large quantity of flow conduits that each have a relatively small cross-sectional flow area, based on extending through interstitial spaces between packing objects in the pile structure, may cause a reduction in operational and maintenance costs for a nuclear plant, as the improved protection to the natural circulation air cooling system provided by said divided and multiple flow paths of the pile structure, which also may be sufficiently small to frustrate or prevent direct access to the natural circulation air cooling system from the ambient environment via one or more openings thereof, may result in a reduced need for security staffing and/or resource allocation in and around the reactor building, as the pile structure may create a security "strong point" that requires less active security protection than an exposed air inlet and/or outlet of a natural circulation air cooling system. As site security may be one of the largest operational and maintenance costs for a nuclear power plant, the pile structure may cause a reduction in operational and maintenance costs for a nuclear power plants based on causing a reduction in site security.

In some example embodiments, where the natural circulation air cooling system includes one or more conduits extending underground from the one or more conduits in thermal communication with the nuclear reactor to the at least one opening overlaid by the pile structure, the pile structure may rest (e.g., stand freely) upon an opening (air inlet and/or air outlet opening) that is at or near grade and further may rest on the surrounding soil, natural rock, living rock, and/or concrete pad. Such surrounding soil and/or concrete may provide an additional barrier to access to conduits of the natural circulation air cooling system and thus may provide improved protection to the natural circulation air cooling system and the nuclear reactor cooling capability provided thereby. As a result, the underlying soil, rock, and/or concrete may provide additional protection against a bypass attempt around the inlet openings and/or outlet openings to the conduits enabling air flow between said openings and the one or more conduits in thermal communication with the nuclear reactor.

Figure 2A:
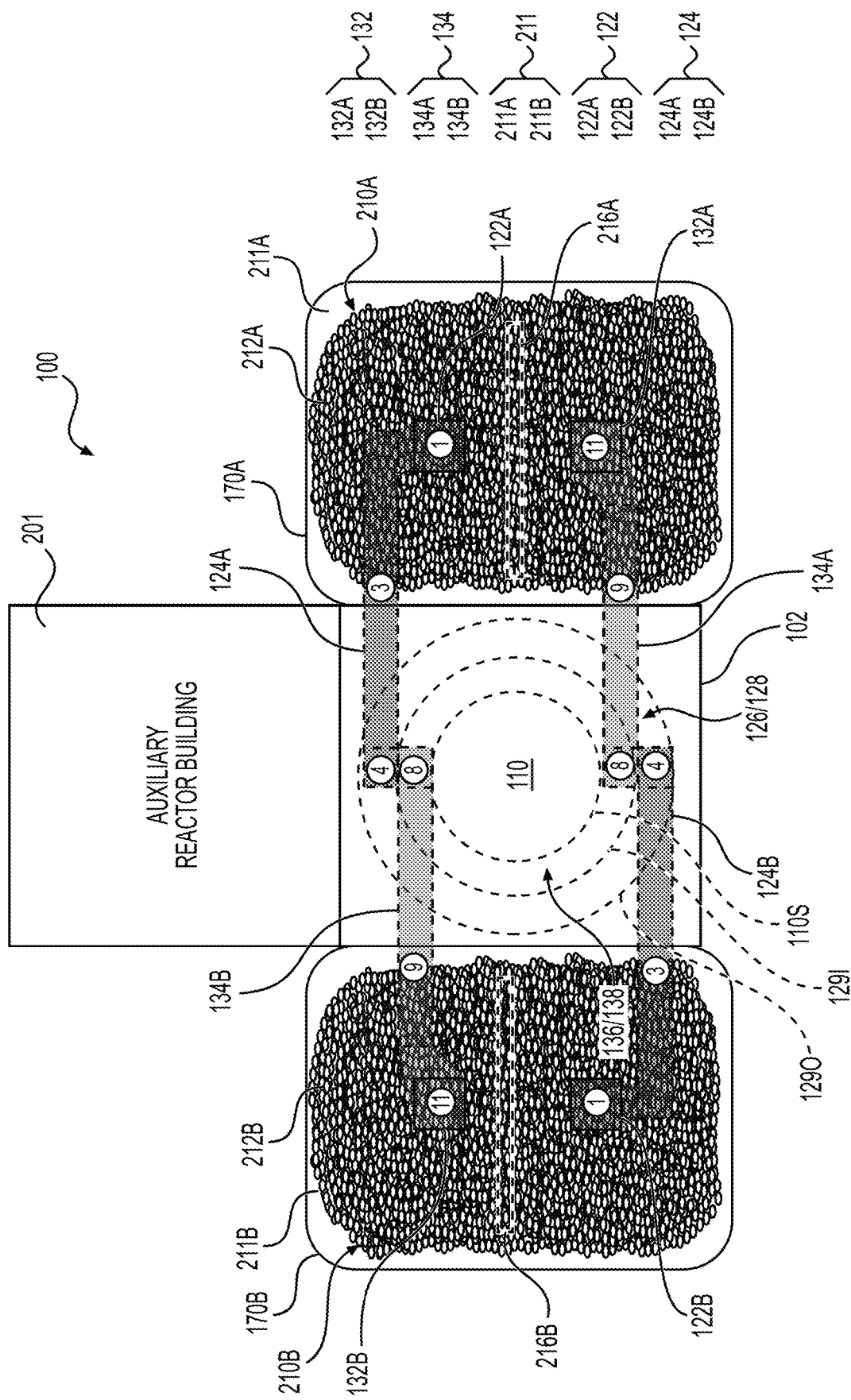
FIG. 2A is a top view of the nuclear plant of FIG. 1, according to some example embodiments.
Figure 2B:
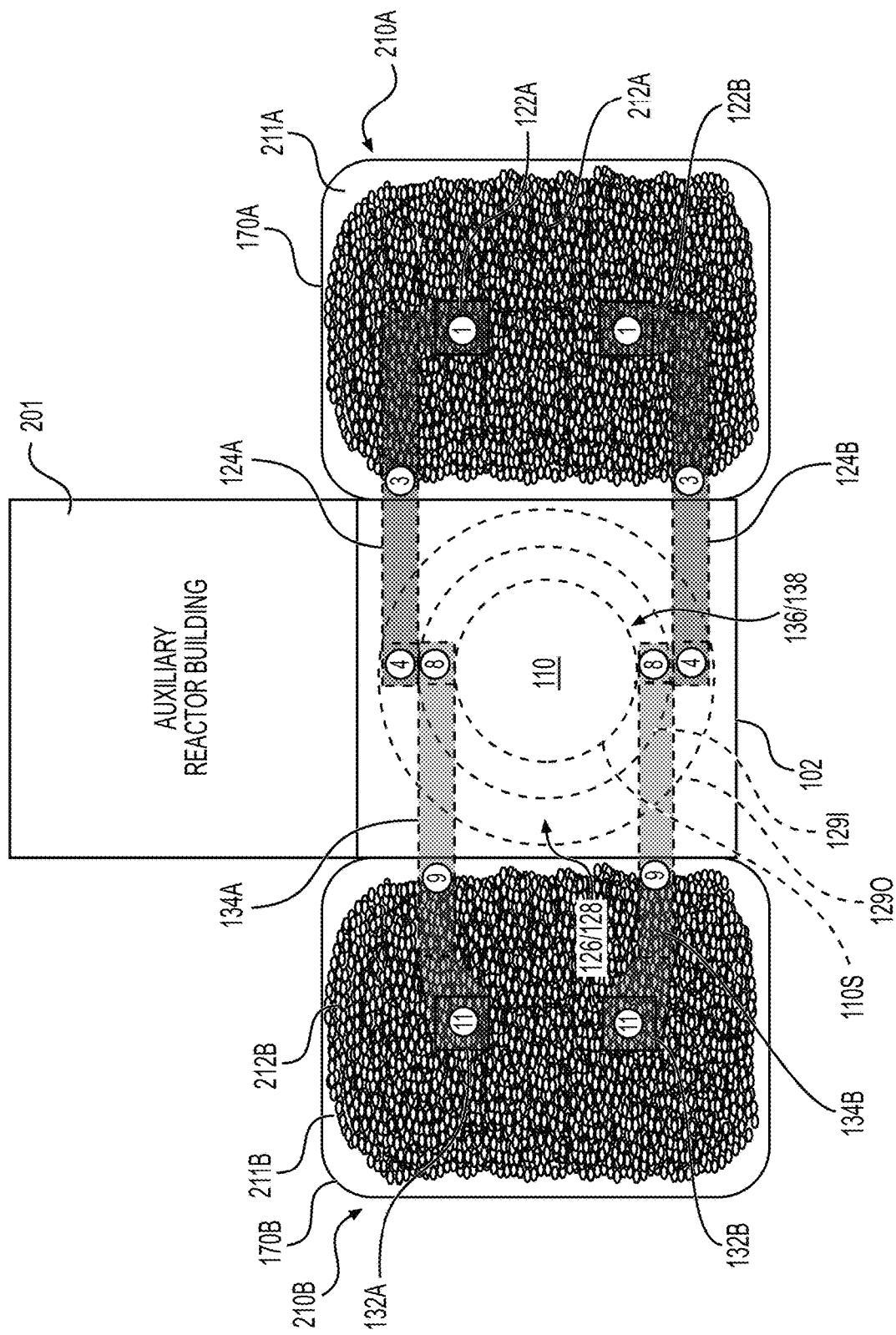
FIG. 2B is a top view of the nuclear plant of FIG. 1, and auxiliary building(s) according to some example embodiments.
Figure 3:
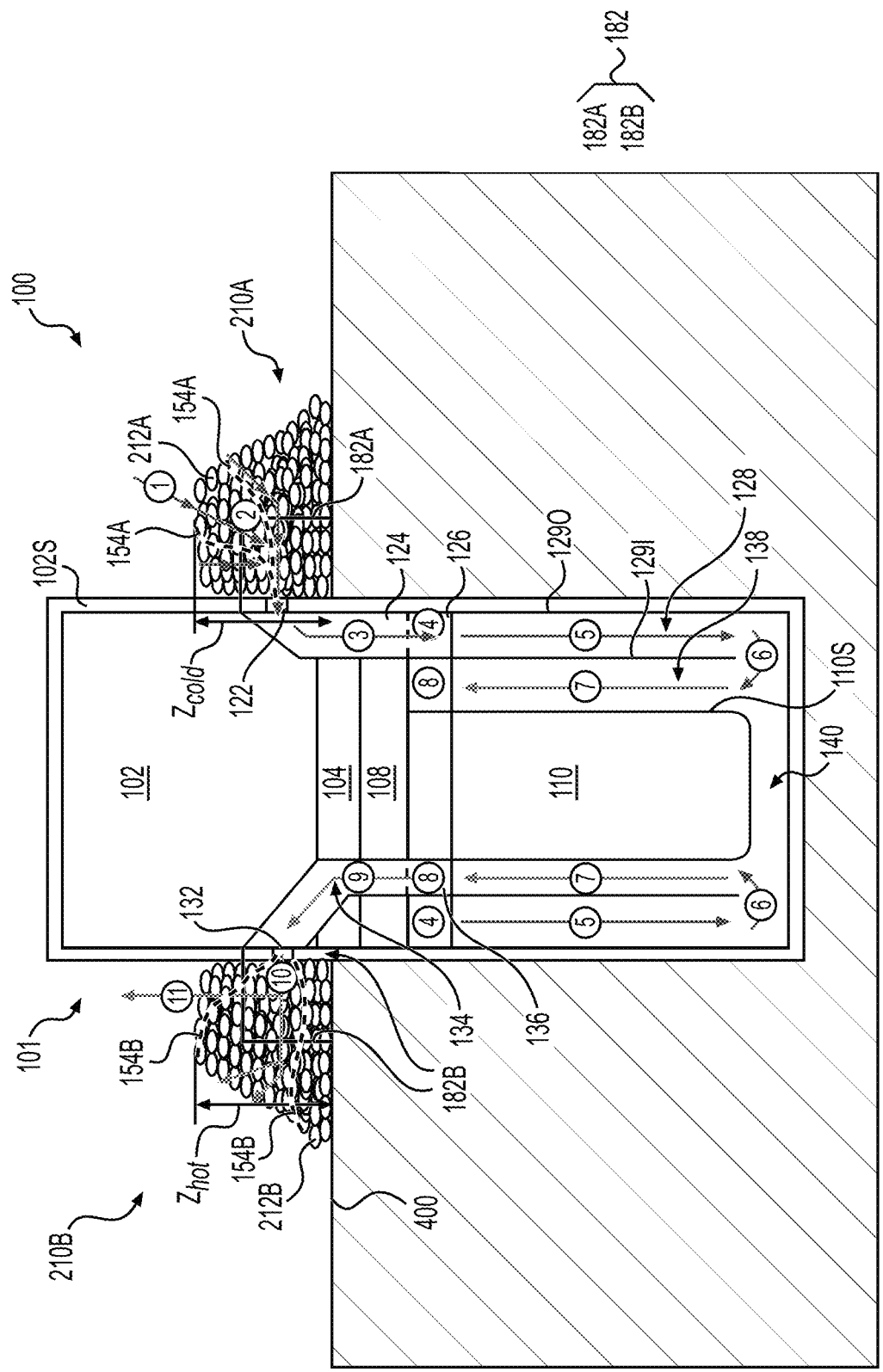
FIG. 3 is a cross-sectional side view of a nuclear plant that includes a natural circulation heat removal system and pile structures, according to some example embodiments.
Figure 4A:
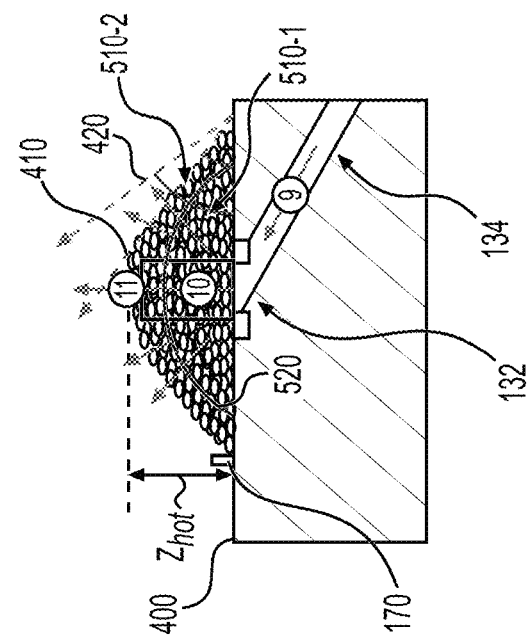
FIG. 4A is a cross-sectional side view of a first pile structure covering an air inlet of a natural circulation heat removal system, according to some example embodiments.
Figure 4B:
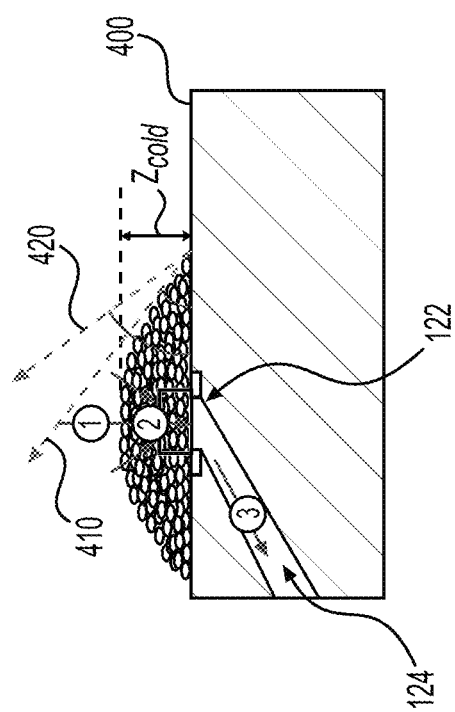
FIG. 4B is a cross-sectional side view of a second pile structure covering an air outlet of a natural circulation heat removal system, according to some example embodiments.
Figure 6B:
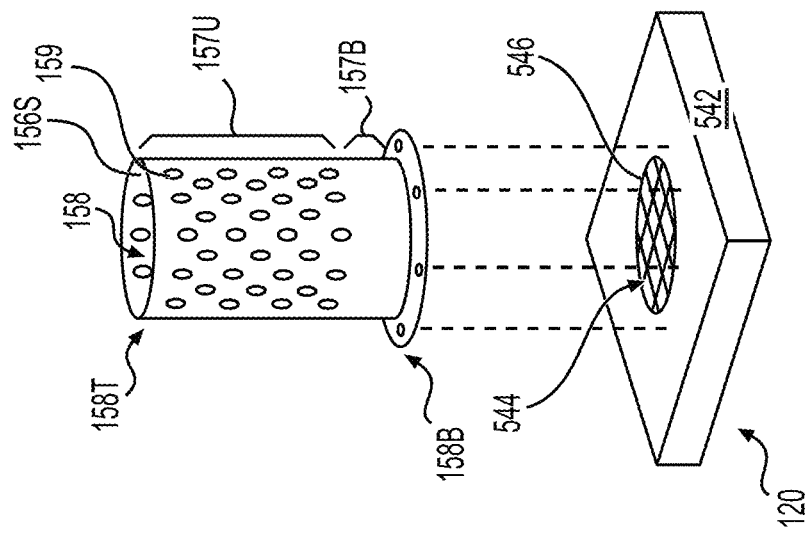
FIGS. 6A and 6B are perspective exploded views of a channel structure coupled to an opening within a pile structure, according to some example embodiments.
Figure 6A:
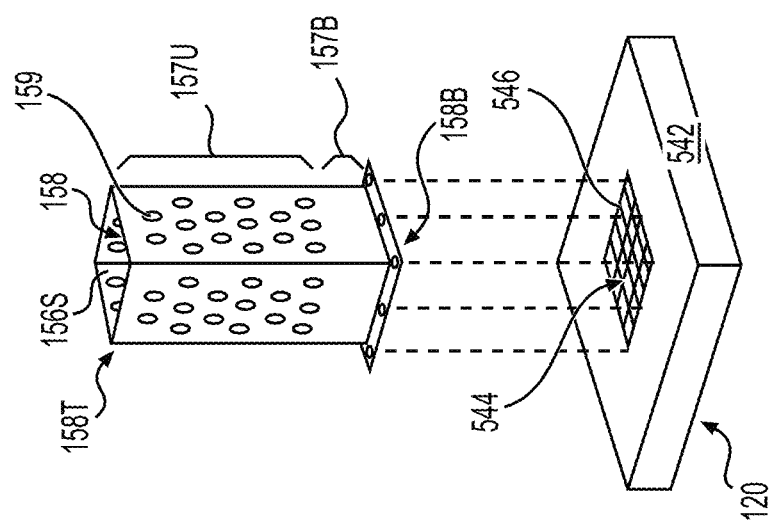

FIG. 1 is a cross-sectional side view of a nuclear plant that includes a natural circulation heat removal system and pile structures, according to some example embodiments. FIG. 2A is a top view of the nuclear plant of FIG. 1, according to some example embodiments. FIG. 2B is a top view of the nuclear plant of FIG. 1, and auxiliary building(s) according to some example embodiments. FIG. 3 is a cross-sectional side view of a nuclear plant that includes a natural circulation heat removal system and pile structures, according to some example embodiments. FIG. 4A is a cross-sectional side view of a first pile structure covering an air inlet of a natural circulation heat removal system, according to some example embodiments. FIG. 4B is a cross-sectional side view of a second pile structure covering an air outlet of a natural circulation heat removal system, according to some example embodiments. FIGS. 5A and 5B are perspective exploded views of a channel structure coupled to an opening within a pile structure, according to some example embodiments. FIGS. 6A and 6B are perspective exploded views of a channel structure coupled to an opening within a pile structure, according to some example embodiments.

Referring to FIGS. 1, 2A, and 2B, the nuclear plant 100 includes a reactor building 102, including reactor building outer walls 103 (which may be load-bearing walls) that includes a reactor room 106 in which a nuclear reactor 110 is located. The reactor building 102 further includes a refueling deck 104 located above the nuclear reactor 110. In some example embodiments, the nuclear reactor 110 as shown in the drawings may include a containment structure that contains a nuclear reactor. As also shown in FIGS. 2A and 2B, a nuclear plant 100 may further include an auxiliary reactor building 201 laterally adjacent to the reactor building 102 that includes the nuclear reactor 110.

It will be understood that a "nuclear reactor" as described herein may include any or all of the well-known components of a nuclear reactor, including a nuclear reactor core with or without nuclear fuel components, control rods, or the like. It will be understood that a nuclear reactor as described herein may include any type of nuclear reactor, including but not limited to a Boiling Water Reactor (BWR), a Pressurized Water Reactor (PWR), a liquid metal cooled reactor, a Molten Salt Reactor (MSR), or the like. As described herein, a nuclear reactor may include an Advanced Boiling Water Reactor (ABWR), an Economic Simplified Boiling Water Reactor (ESBWR), a BWRX-300 reactor, or the like.

As shown in FIG. 1, a nuclear reactor 110, as described herein, may be located at least partially or entirely below grade 400, referred to as an embedded reactor. But example embodiments are not limited thereto, and in some example embodiments the nuclear reactor 110 may be partially or entirely located above grade 400.

As shown in FIGS. 1, 2A, and 2B, the nuclear plant 100 includes a natural circulation air cooling system 150, referred to herein as simply "cooling system 150," that is configured to provide cooling of the nuclear reactor 110 based on natural circulation of ambient air 1-11 from the ambient environment 101 and through the cooling system 150 to remove reactor-rejected heat 190 from the nuclear plant 100 to the ambient environment 101. As used herein, natural circulation of air may refer to a circulation, or flow, of ambient air that is not driven by energy consumption or operation of a device that consumes energy to drive the circulation, such as operation of a flow generator device, e.g., a pump, to induce, control, and/or maintain the flow of ambient air. Thus, the cooling system 150 provides a passive, or natural circulation cooling capability, (e.g., a cooling capability that is not driven by energy consumption, such as operation of a flow generator device, e.g., a pump, to induce, control, and/or maintain a flow of coolant fluid) wherein air buoyancy forces produced by density and vertical height differences throughout the cooling system 150 drives the circulation of air 1-11 through the cooling system 150 to remove heat 190 from the nuclear plant 100. It will be understood that, in some example embodiments, the cooling system 150 may include one or more flow generator devices (e.g., one or more pumps, blowers, compressors, fans, or the like) that induce, control, and/or maintain flow of air through one or more portions of the cooling system 150.

As shown in at least FIG. 1, the cooling system 150 circulates ambient (e.g., ambient-temperature) air (1-6) from the ambient environment 101 to one or more conduits that are in thermal communication with the nuclear reactor 110 so that the air 7 in the one or more conduits absorbs reactor-rejected heat 190 and thus becomes heated. The cooling system 150 further causes the heated air (7-11) to be circulated from the one or more conduits back into the ambient environment 101, such that the ambient environment 101 serves as a heat sink for the cooling system 150.

The ambient air 1-6 that is drawn into the cooling system 150 from the ambient environment may have an ambient temperature based on the ambient environment conditions (e.g., 0° C.-35° C., including 20° C., although the temperature of ambient air 1-6 may be hotter or colder). As referred to herein, the air 7-11 that has absorbed heat 190 from the nuclear reactor 110 may have a temperature that is greater than that of the ambient environment 101, and thus greater than the temperature of ambient air 1-6. For example, the outer surface 110S of the nuclear reactor 110 may reach a temperature of between 155° C. to 350° C. and/or potentially equal to or greater than 600° C. As a result, ambient air 1-6 may be referred to herein as "cold air," and air 7-11 may be referred to herein as "hot air."

As shown in FIG. 1, the cooling system 150 may include an air inlet opening 122, also referred to herein as a "cold air inlet," a cold air inlet conduit 124, a cold air plenum 126, a cold air conduit 128, a connection plenum 140, a hot air conduit 138, a hot air plenum 136, a hot air outlet conduit 134, and an air outlet opening 132, also referred to herein as a "hot air outlet."

As shown in FIGS. 1, 2A, and 2B, the air inlet opening 122 and air outlet opening 132 may each be located at grade 400 (e.g., local ground surface level or elevation) and face upwards, but example embodiments are not limited thereto. The cold air inlet conduit 124 may connect the air inlet opening 122 to the cold air plenum 126, and the hot air outlet conduit 134 may connect the air outlet opening 132 to the hot air plenum 136.

The cooling system 150 may further include a collector cylinder 1291 and a cylindrical silo wall 1290 that concentrically surround the nuclear reactor 110. The inner surface of the cylindrical silo wall 1290 and the outer surface of the collector cylinder 1291 may collectively define an annular cold air conduit 128 that is connected to the cold air plenum 126 at a top end and extends vertically around the nuclear reactor 110. The inner surface of the collector cylinder 1291 and the outer surface 110S of the nuclear reactor 110 may collectively define an annular hot air conduit 138 that is connected to the hot air plenum 136 at a top end and extends vertically around the nuclear reactor 110. As shown, the hot and cold air conduits 138 and 128 may be concentrically arranged around the nuclear reactor 110, but example embodiments are not limited thereto. The collector cylinder 1291 laterally partitions (and, in some example embodiments, insulates) the hot and cold air conduits 138 and 128 from each other.

As shown in FIG. 1, the collector cylinder 1291 is spaced apart from a bottom surface 129B of the cylindrical silo wall 1290 to define a connection plenum 140 between the bottom surface 129B and the bottom edge of the collector cylinder 1291. The hot and cold air conduits 128 are each open, at respective bottom ends defined by the bottom edge of the collector cylinder 1291, to the connection plenum 140, such that air may flow between conduits 128 and 138 via the connection plenum 140.

Referring to FIGS. 1, 2A, and 2B, cold air 1-2 (e.g., ambient air having a temperature that is approximately at the ambient temperature of the ambient environment 101, e.g., 0° C.-35° C., such as 20° C.) is drawn from the ambient environment 101 into cooling system 150 via air inlet opening 122 and is further drawn, as cold air 3, via one or more cold air inlet conduits 124 into the cold air plenum 126. In some example embodiments, the cooling system 150 may include multiple air inlet openings 122 and cold air inlet conduits 124 that are connected to a common (same) cold air plenum 126, such that cold air (e.g., air 3) drawn through multiple cold air inlet conduits 124 may mix within the cold air plenum 126 as air 4.

The cold air in the cold air plenum 126 (cold air 4) may flow through one or more cold air conduits 128 as cold air 5. As shown, the cold air 5 flows downwards, at least partially in the direction of gravity. The cold air 5 may be discharged from the cold air conduit 128 via the open bottom opening thereof into the connection plenum 140 as cold air 6.

Cold air 6 in the connection plenum 140 may turn 180-degrees and flow upwards into the hot air conduit 138 as air 7. The hot air conduit 138 is in thermal communication with the nuclear reactor 110 via at least the outer surface 110S of the nuclear reactor 110 that defines a boundary of the hot air conduit 138. Heat 190 rejected from the nuclear reactor 110 may be transmitted into the hot air conduit 138 via the outer surface 110S. Such heat 190 transmitted into the hot air conduit 138 may be absorbed by air 7 that is located in the hot air conduit 138. As a result of absorbing heat, the air 7 located in the hot air conduit 138 may become heated, such that a temperature of the air 7 increases, relative to the temperature of the ambient "cold" air 1-6 (e.g., air 7 may be heated to 155° C., to 350° C., to more than 600° C., or any combination thereof). Thus, air 7 may be referred to as "hot air."

Based on having absorbed heat 190 and having become heated, hot air 7 may have a reduced density relative to the density of cold air 1-6 having a temperature approximately that of the ambient temperature of the ambient environment 101. Restated, hot air 7 may have a greater buoyancy than cold air 1-6. As a result, cold air 6 may flow from the connection plenum 140 and into the hot air conduit 138 via the bottom opening thereof and thus displace the hot air 7 in the hot air conduit 138 due to the reduced density of hot air 7 in relation to cold air 6.

Additionally, as shown in FIG. 1, the cooling system 150 is configured such that the air flow path of air 7-11 in the cooling system 150 proceeds vertically upwards from the nuclear reactor 110, such that the hot air 7 is thus caused to "rise" through, and out of, the hot air conduit 138 into the hot air plenum 136 as hot air 8, and further through one or more hot air outlet conduits 134 connected to the hot air plenum 136 as hot air 9, and further through one or more air outlet openings 132 and back into the ambient environment 101 as hot air 10, 11, where the temperature of the hot air 11 that is discharged into the ambient environment 101 is greater than the temperature of the cold air 1 that is drawn into cooling system 150. The ambient environment 101 thus serves as a heat sink for cooling system 150.

As shown, the conduits, openings, plenums, and structure of the cooling system 150 are structured so that the flow path of "hot" air 7-11 proceeds generally vertically upwards (e.g., at least partially against the direction of gravity), and the flow path of "cold" air 1-6 proceeds generally vertically downwards (e.g., at least partially in the direction of gravity). As a result, the circulation of air 1-11 through cooling system 150 to provide cooling of the nuclear reactor 110 due to heat 190 removal is driven by the reduction in density (e.g., increased buoyancy) of hot air 7-11 relative to the cold air 1-6 due to air 7 absorbing heat 190 from the nuclear reactor 110, such that cold air 6 displaces the hot air 7 at the bottom of the hot air conduit 138, thereby pushing hot air 7-11 to "rise" out of the system 105 and to move generally vertically upwards towards the ambient environment 101 and further causing additional cold air 1-5 to be drawn generally vertically downwards into the cooling system 150 to replace displaced air therein. Additionally, the air 6 at the bottom of the hot air conduit 138 is colder due to the downwards vertical path through the cooling system 150 followed by cold air 1-6 resulting in colder, higher-density air 6 being located in the connection plenum 140. Accordingly, the circulation of air 1-11 may proceed without operation of a flow generator device that consumes energy (e.g., a pump, blower, or the like) and thus said circulation may be referred to as "natural circulation" of air 1-11. Thus, cooling system 150 may be understood to operate to provide cooling of the nuclear reactor 110 based on "natural circulation" of ambient air to and from the ambient environment.

Still referring to FIGS. 1, 2A, and 2B, the nuclear plant 100 includes one or more pile structures 210 that each cover at least one opening of an air inlet opening 122 or an air outlet opening 132 of the natural circulation air cooling system 150, where the pile structure includes a pile of packing objects covering the at least one opening, such that the at least one opening is obscured from direct exposure to the ambient environment 101 by the pile of the packing objects.

FIG. 1 illustrates nuclear plant 100 as including two pile structures 210A, 210B that each include a separate pile of first and second packing objects 212A and 212B and each cover a separate opening of the air inlet opening 122 or the air outlet opening 132. The following description provided with regard to pile structure 210 and packing objects 212 thereof will be understood to apply to any of the pile structures (e.g., 210A, 210B) and/or packing objects (e.g., 212A, 212B) of the nuclear plant 100 according to any of the example embodiments. It will be understood that, while FIGS. 1, 2A, and 2B illustrate two pile structures 210A, 210B that collectively cover all of the openings 122, 132 of the cooling system 150, the nuclear plant 100 may include a single pile structure 210 (e.g., 210A or 210B) which may cover one or more openings 120 (e.g., 122 and/or 132) such that one or more openings 120 (e.g., 122 and/or 132) of the cooling system 150 are not covered by any pile structure as described herein.

Referring generally to FIGS. 1, 2A, and 2B, each pile structure 210 includes a "pile" of packing objects 212 that cover one or more openings 120 of cooling system 150, where said one or more openings 120 may include an air inlet opening 122 and/or an air outlet opening 132 of the cooling system 150.

The pile structure 210 may encompass a "heap" of packing objects 212, a "pile" of packing objects 212, and/or a "stack" of packing objects 212. The term "pile" will be used herein to refer to an arrangement of packing objects 212 which may encompass a "heap," "pile," or "stack" of packing objects 212, as these terms are commonly known.

Each "pile" may include an ordered arrangement of packing objects 212 to provide a particular structure having ordered (e.g., determined by an ordered structure), interstitial spaces between adjacent packing objects 212 in the pile. An ordered arrangement of packing objects may include a three-dimensional lattice ("lattice structure") of the packing objects 212 that corresponds to three-dimensional crystal structures, where the individual packing objects 212 define separate lattice points of the structure. For example, the packing objects 212 may define a three-dimensional lattice structure that is a body-centered cubic structure, a face-centered cubic structure, a primitive cubic structure, or the like. In some example embodiments, the packing objects 212 may define a three-dimensional lattice structure that is a hexagonal closest packed structure, a cubic closest packed structure. It will be understood that the packing objects may be arranged to define any known packed structure or lattice structure. A three-dimensional lattice may be a symmetrical lattice, although example embodiments are not limited thereto.

Each "pile" may include a non-ordered arrangement of packing objects 212 that may have randomized and/or non-orderly arrangements of interstitial spaces between packing objects in the pile, which may improve protection provided by the pile structure 210 against the ability to access an opening covered by the pile structure 210 due to the interstitial spaces and air flow conduits therethrough not be determined by a particular ordered structure. In another example, the pile structure 210 may include a mixture of ordered and non-ordered arrangements of packing objects 212. For example, referring to FIG. 4B, a pile structure 210 may include a lower first sub-pile 510-1, adjacent to the opening 120 covered by the pile structure, where the lower first sub-pile 510-1 includes an ordered arrangement of packing objects 212, and the pile structure 210 may include an upper, second sub-pile 510-2, resting on the lower first sub-pile 510-1, where the upper second sub-pile 510-2 includes a disordered arrangement of packing objects 212. In another example, a pile structure 210 may include first and second packing objects, where the first packing objects are arranged in an ordered structure (e.g., a three-dimensional lattice structure) in the pile structure while the second packing objects (which may be smaller than the first packing objects) are arranged in a disordered arrangement within the interstitial spaces between the first packing objects.

The pile structure 210 may be a stable, self-supporting structure established by the packing objects 212 and resting (e.g., standing freely) on a covered opening 120 of the cooling system 150 without being supported by another support structure (e.g., a supporting wall). It will be understood, however, that example embodiments are not limited thereto; in some example embodiments, the pile structure 210 may abut and/or include a supporting structure that at least partially supports the arrangement and/or load of packing objects 212 in the pile structure 210 and thus at least partially supports the shape and/or structure of the pile structure 210.

The packing objects 212 of a pile structure 210 may be homogenous or may be heterogeneous (e.g., a pile structure 210 may include multiple separate types of packing objects 212 in one or more arrangements therein). The packing objects 212 may comprise various materials, including natural rock (e.g., granite), synthetic rock (e.g., ceramic, engineered quartz, etc.), concrete, metal, or any combination thereof. The packing objects 212 may each have one or more particular shapes, including shapes configured to enable a particular stacking or ordered arrangement (e.g., forming a particular 3D lattice structure, shapes configured to interlock and/or complementarily interface, or the like). But, in some example embodiments, one or more packing objects 212 may have different shapes.

For example, in some example embodiments, the packing objects 212 may include, but are not limited to, various rock materials, including synthetic rock materials and/or natural rock materials. In some example embodiments, the packing objects 212 may include concrete structures, silica beads, stones, sand, and/or any fire resistant agents. In some example embodiments, the packing objects 212 may include various types of objects, including but not limited to concrete structures, which may be interlocked and/or arranged together to form larger structures. Such objects and/or structures formed thereby may include at least one of "rip rap," shot rock, rock armor, spherical concrete structures, knitted concrete structures, grid metal lattice structures, concrete breakwater structures, "Dolos" structures (e.g., "dolosse"), KOLOS structures (e.g., concrete interlocking armor structures), engineered Portland cement shapes that may or may not be interlocking, "Tetrapod" concrete structures, any combination thereof, or the like.

In some example embodiments, the pile structure 210 may be include a mixture of different types of packing objects 212 which may have different structures, sizes, shapes, material compositions, any combination thereof, or the like. As a result, the pile of packing objects 212 that comprise the pile structure 210 may have various packing densities and may define interstitial spaces having various sizes.

In some example embodiments, at least some of the packing objects 212 are configured to react with materials passing through the pile structure 210 interior (e.g., air flow conduits thereof) to control the environment in the cooling system 150 and/or ambient environment. In some example embodiments, some or all of the packing objects 212 may include filter media materials configured to enable mechanical removal of water (e.g., from the cold air 1-2 being drawn into the cooling system 150 via the pile structure 210A). For example, the packing objects 212 may include one or more of activated alumina (Al2O3), activated charcoal, organic wax, or plastic. Such packing objects may be included in a pile structure 210A that covers an air inlet opening 122 of cooling system 150 to thereby control water egress into the cooling system 150. In some example embodiments, some or all of the packing objects 212 may include filter media materials configured to enable removal of radioactive materials (e.g., from the hot air 10-11 being discharged from the cooling system 150 via the pile structure 210B). For example, the packing objects 212 may include materials such as sand, beads, alumina that provide an absorptive surface for radionuclides. Such packing objects may be included in a pile structure 210B that covers an air outlet opening 132 of cooling system 150 to thereby control radioactive materials (e.g., radioactive aerosol, radioactive gas) discharge into the ambient environment 101.

In some example embodiments, at least some of the packing objects 212 in a pile structure 210 are configured to release a molten salt (e.g., molten fluoride salt) upon heating, for example in the presence of a fire (e.g., a burning fluid passing through air flow conduits of the pile structure 210 interior), so as to smother and suppress the fire and reduce or prevent egress of the fire and/or burning fluids into the cooling system 150 and/or to affect cooling capability provided by the cooling system 150. In some example embodiments, at least some of the packing objects 212 may include and or may comprise a polymer matrix (e.g., polyimides, polybenzoxazoles (PBOs), polybenzimidazoies, and polybenzthiazoles (PBTs)) configured to decompose in the presence of heat in order to provide a "blanketing" structure that covers and smothers the potential fire. The pile structure 210 may be configured to retain sufficient cumulative cross-sectional flow area even if portions of the air flow conduits of the pile structure 210 are blocked due to said smothering, thereby providing improved robustness and protection of cooling capability provided by the cooling system 150 with regard to fire and/or movement of burning fluids towards one of the openings 120.

The pile structure 210 may be configured to define multiple air flow conduits 154 through the interior thereof, where the air flow conduits 154 (e.g., 154A and 154B in pile structures 210A and 210B, respectively) are at least partially defined by, and extend through, interstitial spaces between adjacent packing objects 212 of the pile structure 210. Example air flow conduits 154A and 154B as shown in FIGS. 1 and 3 as non-linear conduits defined between adjacent packing objects 212 of pile structures 210 and thus extending through said pile structures 210 between an opening 120 and the ambient environment 101. It will be understood that the example air flow conduits 154A and 154B illustrated in FIGS. 1 and 3 are examples of air flow conduits 154 through the pile structures 210, and the pile structures 210 are not limited to the quantity and arrangement of the illustrated example air flow conduits 154A and 154B. In fact, the number (quantity) of different air flow conduits 154 within a given pile structure 210 and thus extending between an opening and the ambient environment 101 through the given pile structure 210 may be greater than 100, greater than 1,000, or greater than 1,000,000. The pile structure 210 may be configured to define interstitial spaces between adjacent packing objects 212 that are sufficiently small to frustrate or preclude direct human or machine access to an opening 120 covered by the pile structure 210 and are sufficiently numerous such that the cumulative cross-sectional flow area of the air flow conduits 154 between the covered opening 120 and the ambient environment 101 through the pile structure 210 is not easily reduced below a flow area that supports cooling capability provided by the cooling system 150.

Such a pile structure 210 may have packing objects 212 that collectively have at least a particular packing density, a maximum interstitial spacing between adjacent packing objects, some combination thereof, or the like.

In some example embodiments, the pile of packing objects 212 in a pile structure 210 may define a structure having a packing density that is greater than or equal to about 750 kg/m$^3$. For example, the packing density of packing objects 212 comprising the pile structure 210 may be equal to or greater than about 1,300 kg/m$^3$.

The packing objects 212 may have various sizes, shapes, and/or weights. In some example embodiments, each packing object 212 of the pile structure 210 may have a weight of at least ½ metric ton so that the packing objects 212 are individually too heavy to be easily moved without application of substantial resources (e.g., heavy lifting machinery), thereby providing improved protection and securing to the opening 120 covered by the pile structure 210.

In some example embodiments, a maximum cumulative volume of the interstitial spacing between adjacent packing objects 212 in the pile of the packing objects 212 comprising the pile structure 210 is equal to or less than about 60% of the total volume of the pile structure 210. For example, a maximum cumulative volume of the interstitial spacing between adjacent packing objects 212 in the pile of the packing objects 212 comprising the pile structure 210 is equal to or less than about 30% of the total volume of the pile structure 210.

In some example embodiments, a maximum interstitial spacing between any adjacent packing objects 212 in the pile of the packing objects 212 comprising the pile structure 210 is equal to or less than about 12 inches. For example, a maximum interstitial spacing between any adjacent packing objects 212 in the pile of the packing objects 212 comprising the pile structure 210 is equal to or less than about 3 inches.

In some example embodiments, a pile structure 210 is configured to direct air (e.g., cold air 1-2 and/or hot air 10-11) to flow between a covered opening 120 and the ambient environment 101, through interstitial spaces between adjacent packing objects 212 in the pile of the packing objects 212, such that a pressure difference between the ambient environment 101 and the covered opening 120 through the pile of the packing objects 212 is equal to or less than a particular value. Such a configuration may ensure that the pile structure 210 has a reduced or minimal effect on the operation of the cooling system 150. Such a configuration may further ensure that a satisfactory pressure difference is maintained even if some of the air flow conduits through the pile structure 210 are blocked. For example, the pile structure 210 may be configured such that the pressure difference along a given length of a given air flow conduit 154 between the opening 120 and the ambient environment 101 through the pile structure 210 is equal to or less than about 2 inches of water gauge per foot of distance through the air flow conduit 154. In another example, the pile structure 210 may be configured such that the pressure difference along a given length of a given air flow conduit between the opening 120 and the ambient environment 101 through the pile structure 210 is equal to or less than about 0.5 inches of water gauge per foot of distance through the air flow conduit.

Separate pile structures in a nuclear plant 100 may have same or different structures (e.g., arrangements of packing objects) and/or same or different types of packing objects. In FIG. 1, for example, first pile structure 210A may include an ordered arrangement of first packing objects 212A that create a symmetrical three-dimensional lattice of the second packing objects 212B, while second pile structure 210B may include a disordered arrangement of second packing objects 212B.

As shown in FIGS. 2A and 2B, each pile structure 210 may rest on a pad 211 (e.g., pads 211A and 211B, respectively) that may structurally support the pile structure 210 and may further provide additional protection against subterranean access to the opening 120 covered by the pile structure 210. In some example embodiments, the pad 211 is a concrete pad. As shown in FIGS. 2A and 2B, the opening 120 may extend through the pad 211. In some example embodiments, the pad 211 may include a rubber liner upon which the packing objects 212 of the pile structure 210 rest. Additionally, a media, such as sand, may be under the rubber liner and above local soil. In some example embodiments, the pad 211 may be contoured to direct ambient moisture (e.g., rain, sleet, snow, etc.) in the pile structure 210 interior to be collected at the pad and then removed (e.g., via pumping by a pump device, not shown in the drawings) to mitigate water entrainment in the flow of air into the cooling system 150.

In some example embodiments, the pad 211 may be flat and horizontal. In some example embodiments, at least a portion of the pad 211 may be sloped and may include a horizontal baffling system that supports and shapes the pile structure 210 and further provides enhanced capture and removal of water from the opening 120. In some example embodiments, said structure of the pad 211 may be located below grade 400.

As shown in FIGS. 1, 2A, and 2B, the nuclear plant 100 may include a curb structure 170 at least partially laterally (horizontally) surrounding each separate pile structure 210. For example, as shown in FIGS. 1, 2A, and 2B, a first curb structure 170A may at least partially surround the first pile structure 210A, and a second curb structure 170B may at least partially surround the second pile structure 210B. Each curb structure 170 may be configured to mitigate, or block, small debris and/or fluid (e.g., water) from entering and/or collecting within the interstitial spaces within the respective pile structure 210 surrounded by the curb structure 170, thereby mitigating the effects of such debris and/or fluid upon the cumulative air flow conduits 154 though the pile structure 210 interior. Each curb structure 170 may comprise various materials, including concrete, soil, rock, metal, any combination thereof, or the like. The vertical height (e.g., elevation) of the curb structure 170 from grade 400 may be, for example, about 6 inches to about 1 foot, and the thickness of the curb structure 170 may also be, for example, about 6 inches to about 1 foot.

Referring to FIGS. 5A-5B and 6A-6B, example openings 120, which may be air inlet openings 122 and/or air outlet openings 132, are shown. As shown, each opening 120 includes a base 542, or "base structure," (which may be a part of the pad 211) and a hole 544 extending therethrough. A grate 546 may cover the hole 544. The grate 546 may be fastened in place by a channel structure (156) described further below that covers and is affixed (e.g., has a flange that is bolted to) the base 542. The grate 546 may be configured to reduce or prevent packing objects 212 from falling into the hole 544 and thus into the cooling system 150. The grating 546 may be absent, and packing objects 212 may be sized to be larger than the hole 544 and/or to have a sufficiently large weight (e.g., ½ metric ton) to mitigate or prevent movement of the packing objects 212 in relation to the hole 544. In some example embodiments, the grating 546 may be a metallic (e.g., steel) grating having a standard U.S. mesh size in a rage between 4 and 40. The grating 546 may be configured to remain after a pressure pulse from gas explosions (e.g., based on being affixed to the base 542 and/or held in place by the weight of the pile structure 210). The grating 546 of an opening 120 that is an air inlet opening 122 may be configured to absorb energy associated with an increase in the pressure at the air inlet opening by deforming.

Referring to FIGS. 4A and 4B, the packing objects 212 of each pile structure 210 may be associated with a particular angle of repose 420 in relation to grade 400, which may be a steepest angle of descent or dip of the pile of packing objects 212 relative to the plane of the grade 400 to which the packing objects 212 can be piled without slumping of the pile. The angle of repose 420 of the pile structure 210 may be dependent on internal friction, size and shape, and density of the packing objects 212. The angle of repose 420 may be further dependent upon a roughness of the base 542 of the covered opening 120 and/or the pad 211 on which the pile structure 210 rests in order to reduce or prevent slippage of the packing objects 212. The angle of repose may be between about 25 degrees and about 45 degrees from grade 400. The pile of the packing objects 212 of a given pile structure 210 may have an angle of elevation 410 that is equal to or less than the particular angle of repose 420 of the packing objects 212 thereof (e.g., the angle of elevation 410 may be less than or equal to than about 90% of the angle of repose 420). As a result, a pile structure 210 having an angle of elevation 410 that is less than the angle of repose 420 of the packing objects 212 of the pile structure 210 may freely stand without support of retaining walls or other supporting structures and thus may be configured to be resistant to easy uncovering of an opening 120 covered by the pile structure 210 (e.g., due to a rock slide, which the pile structure 210 is configure to resist based on having an angle of elevation 410 that is less than the angle of repose 420). The pile structure 210 may thus be resistant to deformation and/or slumping (e.g., packing objects 212 falling out of the pile) due to impacts with the pile structure 210 (e.g., due to aircraft impacts and/or earthquakes). As a result, the robustness of the pile structure 210 having such a reduced angle of elevation 410 in relation to the angle of repose 420 may be improved.

In some example embodiments, a pile structure 210 may include a net structure extending over at least a portion of the packing objects, to provide additional robustness of the pile structure 210 by reducing the tendency for at least some packing objects therein to movement. Additionally, the net structure may provide additional restriction of the largest interstitial spaces within the interior of the pile structure 210, thereby providing further protection from direct human and/or machine access to the overlaid opening 120 through the interior of the pile structure 210.

For example, as shown in FIG. 4B, pile structure 210 includes a lower, first sub-pile 510-1 that is directly on the opening 132 and an upper, second sub-pile 510-2 that covers the first sub-pile 510-1, where the pile structure 210 further includes a net structures 520 covering the first sub-pile 510-1 and thus located between the first and second sub-piles 510-1 and 510-2. The net structure 520 may be, for example, a metallic net (e.g., a steel wire net) with 3-inch openings. The net structure 520 may secure the first sub-pile 510-1 of packing objects from moving from their present location, and the second sub-pile 510-2 may protect the net structure 520 from exposure to damage or dismantling.

However, it will be understood that, in some example embodiments, the net structure 520 may extend over an entire outer surface of the pile structure 210, such that the net structure 520 is directly exposed to the ambient environment 101. Such a net structure 520 may secure the entire pile of packing objects 212 of the pile structure 210 from moving from their present location, thereby improving robustness of the pile structure 210.

While the net structure 520 is only shown in FIG. 4B as being included in the second pile structure 210B that covers an air outlet opening 132, it will be understood that the net structure 520 may be included in a first pile structure 210A that covers an air inlet opening 122, or any of the pile structures 210 according to any of the example embodiments. In some example embodiments, a pile structure 210 may include multiple net structures 520 covering separate, respective sub-piles that cover separate, respective openings 120 covered by the pile structure 210 (e.g., openings 122A and 122B covered by pile structure 210A shown in FIG. 2B) where one or more sub-piles cover both the net structures 520.

While the above description is provided generally with regard to pile structure 210 with packing objects 212 that covers an opening 120, FIGS. 1, 2A-2B, 3, and 4A-4B show that a nuclear plant 100 may include multiple pile structures, for example first and second pile structures 210A and 210B, where the separate pile structures 210A and 210B include separate, respective piles of first packing objects 212A and second packing objects 212B and cover separate openings 120 (openings 122 and 132, respectively) of the cooling system 150 and thus obscure said respective openings 122, 132 from exposure to the ambient environment 101.

Referring to FIG. 1, nuclear plant 100 includes a first "cold" pile structure 210A covering the air inlet opening 122 and obscuring the air inlet opening 122 from direct exposure to the ambient environment 101 and a second "hot" pile structure 210B covering the air outlet opening 132 and obscuring the air outlet opening 132 from direct exposure to the ambient environment 101. As shown in FIG. 1, cold air 1-2 may be drawn into the cooling system 150 via air flow conduits 154A defined by interstitial spaces between adjacent first packing objects 212A of the pile structure 210A, and hot air 10-11 may be discharged into the ambient environment 101 via air flow conduits 154B defined by interstitial spaces between adjacent second packing objects 212B of the pile structure 210B.

As shown in FIG. 1, the pile structures 210A and 210B may be located on opposite sides of the reactor building 102 in which the nuclear reactor 110 is located, such that the nuclear reactor 110 is laterally between the first and second pile structures 210A and 210B, thereby reducing the possibility of hot air 11 recirculating back into the cooling system 150 via the pile structure 210A.

As shown in FIG. 1, the maximum vertical elevation $Z_{hot}$ above grade 400 of the pile structure 210B covering the air outlet opening 132 may be greater than the maximum vertical elevation $Z_{cold}$ above grade 400 of the pile structure 210A covering the air inlet opening 122. As a result, hot air 11 may be discharged from pile structure 210B into the ambient environment 101 at an above-grade height that is above the height at which cold air 1 enters the pile structure 210A, thereby reducing the risk of hot air 11 recirculating into the cooling system 150 and/or heating the cold air 1 that is drawn into the cooling system 150 via the pile structure 210A and thus improving the robustness of the cooling capability provided by the cooling system 150.

Referring to FIGS. 2A and 2B, in some example embodiments a pile structure 210 may cover multiple openings 120 of the cooling system 150. For example, as shown in FIGS. 2A and 2B, the cooling system 150 may include multiple air inlet openings 122A and 122B that are connected to the cold air plenum 126 by respective cold air conduits 124A and 124B, and the cooling system 150 may further include multiple air outlet openings 132A and 132B that are connected to the hot air plenum 136 by respective hot air conduits 134A and 134B.

Referring now specifically to FIG. 2A, in some example embodiments, a pile structure 210 may cover both an air inlet opening 122 and an air outlet opening 132, such that the pile structure 210 may be configured to direct cold air through a portion thereof that covers the air inlet opening 122 and to also direct hot air through a separate portion thereof that covers the air outlet opening. For example, as shown in FIG. 2A, pile structure 210A covers air inlet opening 122A and air outlet opening 132A, and pile structure 210B covers air inlet opening 122B and air outlet opening 132B. As shown, air inlet openings 122 and air outlet openings 132 are provided on each side of the reactor building 102, thereby improving the robustness of the cooling system 150 to receiving cold air from various sides of the reactor building 102 and similarly discharging hot air into the ambient environment 101 at various sides of the reactor building 102. In some example embodiments, the local maximum elevation of the pile structure 210 covering both an air inlet opening 122 and an air outlet opening 132 may be variable, such that a the maximum vertical elevation of the portion of the pile structure 210 that vertically overlaps the air outlet opening 132 is greater than the maximum vertical elevation of the portion of the pile structure 210 that vertically overlaps the air inlet opening 122, thereby reducing the risk of hot air recirculation to the air inlet opening 122.

Still referring to FIG. 2A, a pile structure 210 that covers both an air inlet opening 122 and an air outlet opening 132 may include a wall structure 216 at least partially located within the pile of the packing objects 212 and at least partially obscured from direct exposure to the ambient environment 101 by the packing objects 212, where the wall structure 216 is located laterally between the air inlet opening 122 and the air outlet opening 132 such that opposite sidewalls of the wall structure 216 are proximate to separate, respective openings of the air inlet opening 122 or the air outlet opening 132. For example, as shown in FIG. 2A, pile structure 210A includes wall structure 216A between the air inlet opening 122A and the air outlet opening 132A, and the pile structure 210B includes wall structure 216B between the air inlet opening 122B and the air outlet opening 132B. Each wall structure 216 may be a concrete structure, reinforced concrete structure, metal structure, or the like. The wall structure 216 in a given pile structure 210 may extend laterally along a majority or entirety of a width of the pile structure 210, as shown in FIG. 2A, but example embodiments are not limited thereto. The wall structure 216 in a given pile structure 210 may extend vertically from grade 400 at least partially through the pile structure 210 or to the maximum elevation of the pile structure 210. The wall structure 216 in a given pile structure 210 may at least partition portions of the interior of the pile structure 210 that are proximate to the air inlet opening 122 and he air outlet opening 132 from each other, thereby mitigating or preventing mixing of cold air 2 being drawn into the covered air inlet opening 122 with hot air 10 being discharged from the covered air outlet opening 132 within the interior of the pile structure 210 that covers both the inlet and outlet air openings 122 and 132.

The pile structures 210A and 210B shown in FIG. 2A may be configured to ensure steady performance (e.g., cooling capability) of the cooling system 150, regardless of the wind direction in relation to the nuclear plant 100 on any given day.

While FIG. 2A illustrates two pile structures 210A and 210B covering both an air inlet opening 122 and an air outlet opening 132, example embodiments are not limited thereto. In some example embodiments, the nuclear plant 100 may include a single pile structure (e.g., 210A) covering both of a single air inlet opening 122 (e.g., 122A) of the cooling system 150 and a single air outlet opening 132 (e.g., 132A) of the cooling system 150.

Referring now to FIG. 2B, in some example embodiments, a pile structure 210 may cover multiple air inlet openings 122 or multiple air outlet openings 132. As shown in FIG. 2B, for example, the cooling system 150 may include multiple air inlet openings 122A and 122B on one side of the reactor building 102 and multiple air outlet openings 132A and 132B on another (e.g., opposite) side of the reactor building 102, and pile structure 210A may cover the air inlet openings 122A and 122B while pile structure 210B may cover the air outlet opening 132A and 132B. Said pile structures 210A and 210B may provide improved isolation of the air inlet opening 122 from the outlet air openings 132 and thus improved isolation of the cold air 1-2 from mixing with the hot air 10-11. Thus, the pile structures 210A and 210B of FIG. 2B provide improved protection from hot air recirculation in the cooling system 150. Additionally, by covering multiple air inlet/outlet openings 122 or 132, each pile structure 210 may provide improved robustness to the air inlet or outlet flow paths of the cooling system 150 and thus improve the robustness of the cooling system 150.

Referring to FIG. 3, in some example embodiments the cooling system 150 may be configured such that one or both of an air inlet opening 122 or an air outlet opening 132 extend through an outer sidewall 102S of the reactor building 102 such that the air inlet opening 122 and/or air outlet opening 132 is oriented to face at an angle, or perpendicularly to the grade 400 (e.g., face horizontally as shown). As a result, the cooling system 150 may be configured to cause cold air 1-2 to be drawn laterally (horizontally) into the cooling system 150 via a laterally-oriented (e.g., horizontally oriented) air inlet opening 122 as shown in FIG. 3 and/or to cause hot air 10-11 to be discharged laterally (horizontally) from the cooling system 150 via a laterally-oriented air outlet opening 132 as shown in FIG. 3.

Still referring to FIG. 3, a pile structure 210 covering an opening 120 that extends through an outer sidewall 102S of the reactor building 102 may laterally overlap the opening 120 and may at least partially contact the outer sidewall 102S and/or transfer at least a portion of the structural load of the pile structure 210 to the reactor building 102 via the outer sidewall 102S. The nuclear plant 100 may include horizontal baffles 182 (e.g., 182A and 182B for respective pile structures 210A and 210B) configured to convey air to or from the laterally-oriented openings 120. In the example embodiments shown in FIG. 3, the size of the pile structures 210 in the vertical direction (e.g., the maximum vertical elevations $Z_{hot}$ and $Z_{cold}$) may be reduced, relative to example embodiments where the openings 120 are vertically oriented, for example as shown in FIG. 1) while decreasing the pressure drop of the air flow through the pile structures 210.

In the example embodiments shown in FIG. 3, due to the orientation of the horizontal baffle 182, the pile structures 210 may each include a rubber liner and rubber baffles to decrease cost and remove water. Each horizontal baffle 182 to the opening 120 covered by the pile structure 210 may comprise reinforced concrete or a thin steel plate fastened to the outer sidewall 102S of the reactor building 102. The horizontal baffle 182 may direct a three phase flow of air (gas, liquid, and solids) to or from the hole 544 of the opening 120. The configuration of openings 120 and pile structures 210 with baffles 182 as shown in FIG. 3 may reduce the liquid (water) and solids (dust) from the air before the circulation of ambient air from an ambient environment 101 performing the cooling function. The horizontal baffle 182 may include packing media (e.g., sand) having a granularity that may decrease in size from the opening 120 to an exterior of the pile structure 210 in which the horizontal baffle 182 is located. In some example embodiments, the entire structure of the horizontal baffle 182, may be located below grade 400.

Still generally referring to FIGS. 1, 2A, 2B, and 3, and further referring to FIGS. 5A, 5B, 6A, and 6B, a pile structure 210 may include a channel structure 156 coupled to and laterally surrounding the at least one opening 120 covered by the pile structure 210. As shown in FIGS. 1-4B, a channel structure 156 may be partially or completely located within the interior of the pile structure 210 (and thus may be partially or completely obscured from direct exposure to the ambient environment 101. As shown in FIG. 1-4B, a channel structure 156 may extend away from the covered opening 120 into an interior of the pile structure 210. For example, where the opening 120 is located at grade 400 as shown in FIGS. 1, 2A-2B, and 4A-4B, the channel structure 156 may extend vertically upwards from an opening 120 into an interior of the pile structure 210 covering the opening 120. In another example, where the opening 120 extends through an outer sidewall 102S of the reactor building 102 as shown in FIG. 3, the channel structure may extend laterally or at an angle to the grade 400 away from the opening 120 and into the interior of the pile structure 210.

As shown in FIGS. 5A-5B and 6A-6B, a channel structure 156 may have a sidewall 156S defining an interior channel 158 extending vertically from a bottom opening 158B that is proximate to the at least one opening 120 to a top opening 158T that is distal to the at least one opening. Accordingly, the channel structure 156 may be configured to direct air to flow between the at least one opening 120 and the top opening 158T through the interior channel 158.

In FIGS. 5A-6B, the channel structure 156 is shown as being configured to be coupled to the opening 120 based on having a flange coupled to the bottom of the collar at the bottom opening 158B of the interior channel 158, where the collar may be configured to be affixed (e.g., via a bolt) to the opening 120 (e.g., the base 542 through which a hole 544 of the opening 120 extends).

However, example embodiments are not limited thereto; in some example embodiments the channel structure 156 may be coupled to the opening 120 via various methods, including welding or simply resting on the base, aligned with the hole 544 of the opening 120. The flange shown in FIGS. 5A-6B may be absent in some example embodiments, such that the bottom of the collar defined by the sidewall 156S may be directly coupled to the opening 120 (e.g., base 542 thereof), for example via welding.

In some example embodiments, packing objects 212 may be absent from the interior channel 158 of a channel structure 156 on an opening 120, but in some example embodiments, the interior channel 158 may include packing objects 212 of the pile structure 210 in which the channel structure 156 is included. In some example embodiments, the channel structure 156 may be absent from the pile structure 210, such that packing objects 212 of the pile structure 210 may rest directly on the opening 120 without any interposing structure therebetween. Said packing objects 212 may be sized to prevent the packing objects 212 from falling into the opening 120 (e.g., may be sized to be at least ½ metric ton in weight) and/or the opening 120 may include grating 546 configured to reduce or prevent such packing objects 212 from falling into the hole 544 of the opening 120.

Referring to FIGS. 5A-5B, the channel structure 156 may comprise a completely solid sidewall portion, referred to as a collar, such that the interior channel 158 has only top and bottom openings 158T and 158B, so that air is restricted to flowing vertically between the at least one opening 120 and the top opening 158T. The collar may be configured to mitigate lateral fluid and/or air flow to or from the opening 120 through the sidewall 156S up to a height of the top opening 158T of the channel structure 156. As shown in FIGS. 5A-5B, the collar may define the entirety of the channel structure 156, but example embodiments are not limited thereto.

The channel structure 156 shown in FIGS. 5A-5B, where the sidewall 156S defines only a collar, may be coupled to the air inlet opening 122 and thus located within an interior of a pile structure 210 that covers the air inlet opening 122. But example embodiments are not limited thereto, and in some example embodiments the channel structures 156 shown in FIGS. 5A-5B may be coupled to an air outlet opening 132 and thus located within an interior of a pile structure 210 that covers the air outlet opening 132.

As further shown in FIGS. 5A-5B, the channel structure 156 may have a shape that corresponds to a shape of the hole 544 of the opening 120. For example, in FIG. 5A, where the hole 544 of opening 120 is rectangular (e.g., square-shaped), the channel structure 156 may similarly have a rectangular cross-section and/or may divine an interior channel 158 that has a rectangular cross-section that is similar to, or matching, the rectangular cross-section of the hole 544 of the opening 120. In another example, in FIG. 5B, where the hole 544 of the opening 120 is circular, the channel structure 156 may similarly have a circular cross-section and/or may define an interior channel 158 having a circular cross-section that is similar to, or matching, the circular cross-section of the hole 544 of the opening 120.

Referring to FIGS. 6A-6B, in some example embodiments, the channel structure 156 may include a lower collar portion 157B (or lower solid portion) defining a lower "collar" portion of the interior channel 158, and an upper perforated portion 157U defining an upper "perforated" portion of the interior channel 158. The upper perforated portion 157U may include one or more perforations 159 extending laterally through a thickness of the sidewall 156S of the channel structure 156. As shown in FIGS. 6A-6B, the lower solid "collar" portion 157B does not include any perforations extending through the thickness of the sidewall 156S of the channel structure 156 and is similar to the collar-only channel structure 156 shown in FIGS. 5A-5B. As a result, the channel structures 156 shown in FIGS. 6A-6B may be configured to direct air to flow laterally between the upper perforated portion 157U of the interior channel 158 and the exterior of the channel structure 156 in addition to flowing vertically through the top opening 158T, thereby providing improved air flow into or out of the interior channel 158 and thus providing improved air flow between the opening 120 and the exterior of the channel structure 156. Additionally, the channel structures 156 shown in FIGS. 6A-6B may be configured to inhibit lateral fluid flow to the lower collar portion 157B of the interior channel 158 from the exterior of the channel structure 156. Accordingly, air flow between the opening 120 and the ambient environment 101 (via the overlaying pile structure 210) may be improved while also mitigating lateral flow of fluid (e.g., water) into the at least one opening.

As further shown in FIGS. 6A-6B, the channel structure 156 may have a shape that corresponds to a shape of the hole 544 of the opening 120. For example, in FIG. 6A, where the hole 544 of opening 120 is rectangular (e.g., square-shaped), the channel structure 156 may similarly have a rectangular cross-section and/or may define an interior channel 158 having a rectangular cross-section that is similar to, or matching, the rectangular cross-section of the hole 544 of opening 120. In another example, in FIG. 6B, where the hole 544 of opening 120 is circular, the channel structure 156 may similarly have a circular cross-section and/or may define an interior channel 158 having a circular cross-section that is similar to, or matching, the circular cross-section of the hole 544 of opening 120.

In some example embodiments, a channel structure 156 having perforations 159 in an upper perforated portion 157U thereof, as shown in FIGS. 6A-6B, may be coupled to an air outlet opening 132, within a pile structure 210 that covers the air outlet opening 132, to improve flow of hot air 10 being discharged from the air outlet opening 132 to the ambient environment 101 via the pile structure. But, example embodiments are not limited thereto, and in some example embodiments a channel structure 156 having perforations 159 in an upper perforated portion 157U thereof, as shown in FIGS. 6A-6B, may be coupled to an air inlet opening 122, within a pile structure 210 that covers the air outlet opening 122.

In some example embodiments, a nuclear plant 100 includes a channel structure 156 having no perforations (e.g., the interior channel 158 is entirely defined by a solid collar, with or without flange at a base of the channel structure 156), as shown in FIGS. 5A-5B, that is coupled to an air inlet opening 122 of the cooling system 150 of the nuclear plant 100, within a pile structure 210 that covers the air inlet opening 122, while the nuclear plant 100 further includes a channel structure 156 having perforations 159, as shown in FIGS. 6A-6B, that is coupled to an air outlet opening 132 of the cooling system 150 of the nuclear plant 100, within a pile structure 210 that covers the air outlet opening 132. The height of the channel structure 156 having no perforations (e.g., the height of the "collar" of said channel structure 156 as shown in FIGS. 5A-5B) may be the same, or substantially the same (e.g., up to 10% variation in height), as the height of the lower collar portion 157B of a channel structure 156 having perforations 159, such that the channel structure 156 having perforations 159 may be taller than the channel structure 156 having no perforations and both channel structures 156 may be similarly configured to inhibit lateral fluid flow to a respective opening 120 via the respective solid "collar" portions of said channel structures 156.

While inventive concepts of the pile structures and air cooling systems have been illustrated and described herein with regard to a nuclear plant that includes a nuclear reactor, it will be understood that example embodiments are not limited thereto. For example, a pile structure according to any example embodiment may be installed, or assembled, to cover an opening of an air cooling system that is configured to remove heat from any heat source and/or structure that generates heat below grade 400 (which is the local ground surface level or elevation), based on circulating air from the ambient environment 101 via an air inlet opening to absorb said heat in an air conduit of said air cooling system and further circulating heated air back to the ambient environment via an air outlet opening. Such structures and/or heat sources may be at least partially below grade (i.e., at least partially below the local ground surface level or elevation) and may generate heat at a location that is below grade. Such structures and/or heat sources may include a control room occupied by humans, a chemical reaction tank configured to release heat due to a chemical reaction occurring within the tank, and/or a radioactive storage chamber that stores radioactive material below-grade.

An air cooling system that provides cooling to any heat source and/or structure according to any example embodiments may utilize natural circulation of ambient air from the ambient environment, through one or more conduits to become heated by the heat source(s), and back to the ambient environment to remove heat from the structures and/or heat sources. Such an air cooling system may be similar to any of the example air cooling systems described herein with regard to any of FIGS. 1-7 and/or with regard to nuclear plants, where the nuclear reactor 110 and outer surface 110S thereof may be replaced with the heat source and/or structure and outer surface thereof in such an air cooling system. But, example embodiments are not limited thereto.

In some example embodiments, an air cooling system according to some example embodiments may utilize a flow generator device (e.g., pump, blower, compressor, fan, etc.) to induce, control, and/or maintain a flow of air through at least a portion of the air cooling system to remove heat from the below-grade heat source(s) and/or structures. Such air cooling systems may have a structure similar to or different from the cooling systems described herein, and may include at least one opening, of an air inlet opening or an air outlet opening, which may be covered by a pile structure according to any example embodiments in order to improve robustness and protection of the air cooling system and thus the cooling capability provided by the air cooling system to the below-grade heat source(s) and/or structure(s). In some example embodiments, such air cooling systems may be the cooling systems 150 described with regard to FIGS. 1-6B, where the outer surface 110S is the outer surface of the heat source and/or structure at the location below grade (e.g., below local ground surface level or elevation) where the heat is generated, and may further include one or more flow generator devices configured to induce, control, and/or maintain a flow of air through at least a portion of the air cooling systems.

In some example embodiments, an air cooling system may be configured to direct air from one or more conduits in thermal communication with the heat source(s) and/or structures at least partially or entirely based on operation of one or more flow generator devices of the cooling system to induce, control, and/or maintain a flow of the air from the one or more conduits to the ambient environment, instead of the air cooling system directing such air based at least partially or entirely upon a change in density of the air in the one or more conduits due to absorbing heat from the heat source(s) and/or structures.

A pile structure may cover one or more openings, of one or more air inlet openings and/or one or more air outlet openings, of such air cooling systems so as to provide improved robustness and protection to said air cooling systems and thus the cooling capability provided by the air cooling systems to one or more heat sources and/or structures that may be at least partially below-grade.

Accordingly, it will be understood that any of the pile structures, channel structures, air cooling systems, or the like described herein according to any of the example embodiments may be applied to any system wherein the air cooling system provides cooling of one or more below-grade structures and/or heat sources, including but not limited to a nuclear reactor.

Figure 7:
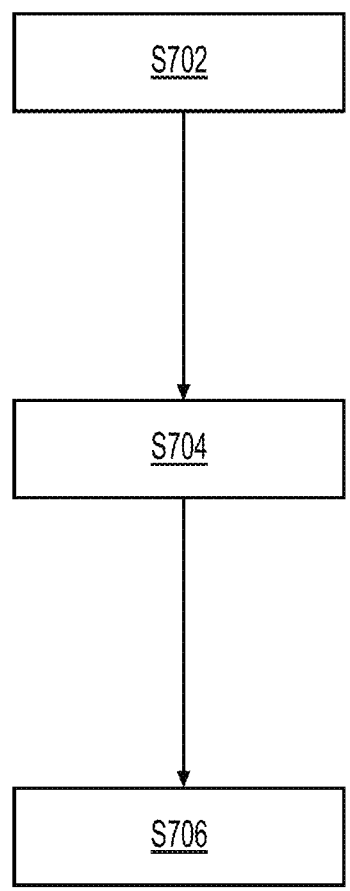
FIG. 7 is a flowchart of a method, according to some example embodiments.

FIG. 7 is a flowchart of a method, according to some example embodiments.

At S702, a nuclear reactor is installed for a nuclear plant. The nuclear reactor may include an embedded nuclear reactor, but example embodiments are not limited thereto, and the nuclear reactor may be any of the nuclear reactors according to any of the example embodiments as described herein. Installing the nuclear reactor may include excavating a volume for construction of a foundation structure, building one or more structures of the nuclear plant, or the like.

At S704, a cooling system is installed in the nuclear plant, where the cooling system may be any air cooling system of the nuclear reactor, including any example embodiment of the natural circulation air cooling systems according to any of the example embodiments. The cooling system, including a natural circulation air cooling system, may define an air inlet opening, an air outlet opening, and one or more conduits extending in thermal communication with the nuclear reactor between the air inlet opening and the air outlet opening. The cooling system may be configured to circulate ambient air from an ambient environment, through the air inlet opening, and into the one or more conduits, and circulate the ambient air from the one or more conduits, through the air outlet opening, and into the ambient environment, based on the ambient air in the one or more conduits absorbing heat rejected from the nuclear reactor such that a density of the ambient air absorbing the heat in the one or more conduits is reduced in relation to ambient air circulated into the one or more conduits from the ambient environment.

At S706, a pile structure may be assembled and/or placed at the nuclear plant that includes the cooling system so as to be assembled and/or placed on at at least one opening of the air inlet opening or the air outlet opening of the cooling system to cover the at least one opening, where the pile structure may be any pile structure according to any example embodiments. The pile structure may include a pile of packing objects overlaying the at least one opening, such that the at least one opening is obscured from direct exposure to the ambient environment by the pile of the packing objects. Assembling the pile structure may include assembling a pile of packing objects on an opening (e.g., air inlet opening and/or air outlet opening) of the cooling system of a nuclear plant to establish the pile structure covering the opening, such that the opening is obscured from direct exposure to an ambient environment by the pile of the packing objects. The pile structure may be assembled on-site over the at least one opening, or may be partially or fully assembled off-site and transported to, and placed on the at least one opening fully or at least partially assembled.

A channel structure, as described herein, may be installed on the at least one opening prior to assembling/placing the pile structure or concurrently with assembling/placing the pile structure. For example, a channel structure may be coupled to the at least one opening (e.g., via bolting a flange of the channel structure to a base of the opening) prior to assembling a pile structure over the opening such that the packing objects of the pile structure are stacked and/or arranged around and/or within the channel structure to obscure the channel structure within the interior of the pile structure.

Additional structures (e.g., wall structure, curb structure, horizontal baffle, or the like) may similarly be may be installed at the nuclear plant prior to assembling/placing the pile structure or concurrently with assembling/placing the pile structure.

Installing the nuclear reactor, installing the natural circulation air cooling system, and/or assembling/placing the pile structure may further include providing, assembling, and/or installing additional elements of the nuclear plant, including the reactor building in which the nuclear reactor is located, an auxiliary building, a pad structure, a curb structure, or the like.

It will be understood that the operations shown in FIG. 7 may be implemented in a different order than shown in FIG. 7. In some example embodiments, a method according to some example embodiments may include additional operations in addition to the operations shown in FIG. 7 or may omit some of the operations shown in FIG. 7.

As noted above, the pile structure and cooling system may be applied to systems other than nuclear plants with nuclear reactors. Accordingly, it will be understood that S702 may include providing a system that includes a heat source and/or structure that is at least partially below grade and which is configured to generate heat at a location that is below grade. Additionally, S704 may include providing an air cooling system configured to remove heat from the heat source and/or structure based on circulating air from/to the ambient environment. The provided air cooling system may be a natural circulation air cooling system according to any example embodiments and/or may include one or more flow generator devices that consume energy to induce, control, and/or maintain a flow of air through at least a portion of the air cooling system (e.g., a fan, blower, compressor, pump, etc.). Additionally, S706 may include assembling and/or placing (e.g., installing) a pile structure according to any example embodiments on at least one opening of an air inlet opening or an air outlet opening of the air cooling system to cover the at least one opening, thereby providing improved robustness and protection to the air cooling system and the cooling capability provided thereby.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims. In addition, while processes have been disclosed herein, it should be understood that the described elements of the processes may be implemented in different orders, using different selections of elements, some combination thereof, etc. For example, some example embodiments of the disclosed processes may be implemented using fewer elements than that of the illustrated and described processes, and some example embodiments of the disclosed processes may be implemented using more elements than that of the illustrated and described processes.

The invention claimed is:

1. A nuclear plant, comprising:
a nuclear reactor;
a natural circulation air cooling system defining an air inlet opening, an air outlet opening, and one or more conduits extending in thermal communication with the nuclear reactor between the air inlet opening and the air outlet opening, such that the natural circulation air cooling system is configured to
 circulate ambient air from an ambient environment, through the air inlet opening, and into the one or more conduits, and
 circulate the ambient air from the one or more conduits, through the air outlet opening, and into the ambient environment, based on the ambient air in the one or more conduits absorbing rejected heat from the nuclear reactor such that a density of the ambient air absorbing the rejected heat in the one or more conduits is reduced in relation to ambient air circulated into the one or more conduits from the ambient environment; and
a pile structure including a first pile structure and a second pile structure each including a pile of packing objects, the first pile structure covering the air inlet opening and the second pile structure covering the air outlet opening such that the air inlet opening and the air outlet opening are obscured from direct exposure to the ambient environment.

2. The nuclear plant of claim 1, wherein the pile of the packing objects includes a three-dimensional lattice of the packing objects.

3. The nuclear plant of claim 1, wherein the pile structure further includes a channel structure coupled to and laterally surrounding at least one opening and extending vertically upwards from the at least one opening into an interior of the pile structure, the at least one opening including at least one of the air inlet opening or the air outlet opening, the channel structure having a sidewall defining an interior channel extending vertically from a bottom opening that is proximate to the at least one opening to a top opening that is distal to the at least one opening, such that the channel structure is configured to
 direct air to flow between the at least one opening and the top opening through the interior channel, and
 inhibit lateral fluid flow to the at least one opening from an exterior of the channel structure.

4. The nuclear plant of claim 3, wherein
the channel structure includes
 a lower solid portion defining a lower portion of the interior channel, and
 an upper perforated portion defining an upper portion of the interior channel, and
the upper perforated portion includes one or more perforations extending laterally through a thickness of the sidewall of the channel structure, and the lower solid portion does not include any perforations extending laterally through the thickness of the sidewall of the channel structure, such that the channel structure is configured to
 direct air to flow laterally between the upper portion of the interior channel and the exterior of the channel structure, and
 inhibit lateral fluid flow to the lower portion of the interior channel from the exterior of the channel structure.

5. The nuclear plant of claim 1, wherein
the packing objects are associated with a particular angle of repose, and
the pile of the packing objects has an angle of elevation that is equal to or less than about 90% of the particular angle of repose.

6. The nuclear plant of claim 1, wherein the pile structure includes a net structure extending over at least a portion of the packing objects.

7. The nuclear plant of claim 6, wherein
the pile structure includes a first sub-pile of the packing objects that covers at least one opening, the at least one opening including at least one of the air inlet opening or the air outlet opening,
the net structure covers the first sub-pile, and
the pile structure further includes a second sub-pile of the packing objects that covers the first sub-pile and the net structure, such that the net structure is located between the first sub-pile and the second sub-pile.

8. The nuclear plant of claim 1, wherein the pile of packing objects has a packing density that is greater than or equal to about 750 to 1,300 $kg/m^3$.

9. The nuclear plant of claim 1, wherein a maximum cumulative volume of interstitial spacing between adjacent packing objects in the pile of the packing objects is equal to or less than about 60% of a total volume of the pile structure.

10. The nuclear plant of claim 1, a maximum interstitial spacing between any adjacent packing objects in the pile of the packing objects is equal to or less than about 12 inches.

11. The nuclear plant of claim 1, wherein the pile structure is configured such that a pressure difference along a given length of a given air flow conduit between at least one opening and the ambient environment through the pile structure is equal to or less than about 2 inches of water gauge per foot of distance through the given air flow conduit, the at least one opening including at least one of the air inlet opening or the air outlet opening.

12. The nuclear plant of claim 1, wherein the packing objects include
a concrete structure.

13. The nuclear plant of claim 1, further comprising:
a curb structure at least partially laterally surrounding the pile structure, the curb structure having a vertical height of about 6 inches to about 1 foot, the curb structure configured to mitigate lateral particulate material entry into the pile of the packing objects.

14. The nuclear plant of claim 1, wherein the pile structure further includes
one or more of activated alumina (Al2O3), activated charcoal, organic wax, plastic, a polymer matrix, or a molten salt.

15. A nuclear plant, comprising:
a nuclear reactor;
a natural circulation air cooling system defining an air inlet opening, an air outlet opening, and one or more conduits extending in thermal communication with the nuclear reactor between the air inlet opening and the air outlet opening, such that the natural circulation air cooling system is configured to
circulate ambient air from an ambient environment, through the air inlet opening, and into the one or more conduits, and
circulate the ambient air from the one or more conduits, through the air outlet opening, and into the ambient environment, based on the ambient air in the one or more conduits absorbing heat rejected from the nuclear reactor such that a density of the ambient air absorbing the heat in the one or more conduits is reduced in relation to ambient air circulated into the one or more conduits from the ambient environment; and
a pile structure covering at least one opening of the air inlet opening or the air outlet opening, the pile structure including a pile of packing objects covering the at least one opening, such that the at least one opening is obscured from direct exposure to the ambient environment by the pile of the packing objects,
the pile structure including
a first pile structure covering the air inlet opening, the first pile structure including a first pile of first packing objects covering the air inlet opening, such that the air inlet opening is obscured from direct exposure to the ambient environment by the first pile of the first packing objects; and
a second pile structure covering the air outlet opening, the second pile structure including a second pile of second packing objects covering the air outlet opening, such that the air outlet opening is obscured from direct exposure to the ambient environment by the second pile of the second packing objects,
the pile structure being one of the first pile structure or the second pile structure, such that the pile of the packing objects is one of the first pile of the first packing objects or the second pile of the second packing objects.

16. The nuclear plant of claim 15, wherein a maximum vertical elevation of the second pile of the second packing objects is greater than a maximum vertical elevation of the first pile of the first packing objects.

17. A nuclear plant, comprising:
a nuclear reactor;
a natural circulation air cooling system defining an air inlet opening, an air outlet opening, and one or more conduits extending in thermal communication with the nuclear reactor between the air inlet opening and the air outlet opening, such that the natural circulation air cooling system is configured to
circulate ambient air from an ambient environment, through the air inlet opening, and into the one or more conduits, and
circulate the ambient air from the one or more conduits, through the air outlet opening, and into the ambient environment, based on the ambient air in the one or more conduits absorbing heat rejected from the nuclear reactor such that a density of the ambient air absorbing the heat in the one or more conduits is reduced in relation to ambient air circulated into the one or more conduits from the ambient environment; and
a pile structure covering at least one opening of the air inlet opening or the air outlet opening, the pile structure including a pile of packing objects covering the at least one opening, such that the at least one opening is obscured from direct exposure to the ambient environment by the pile of the packing objects, the pile structure covering both the air inlet opening and the air outlet opening, such that both the air inlet opening and the air outlet opening are obscured from direct exposure to the ambient environment by the pile of packing objects
the pile structure including a wall structure, the wall structure at least partially located within the pile of the packing objects and at least partially obscured from direct exposure to the ambient environment by the packing objects, the wall structure located laterally between the air inlet opening and the air outlet opening such that opposite sidewalls of the wall structure are proximate to separate, respective openings of the air inlet opening or the air outlet opening.

18. A system, comprising:

a heat source and/or structure located at least partially below a local ground surface elevation, the heat source and/or structure configured to generate heat at a location that is below the local ground surface elevation;

an air cooling system defining an air inlet opening, an air outlet opening, and one or more conduits extending in thermal communication with the heat source and/or structure, at the location that is below the local ground surface elevation where the heat is generated, between the air inlet opening and the air outlet opening, such that the air cooling system is configured to circulate ambient air from an ambient environment, through the air inlet opening, and into the one or more conduits, and circulate the ambient air from the one or more conduits, through the air outlet opening, and into the ambient environment, based on the ambient air in the one or more conduits absorbing heat rejected from the heat source and/or structure; and a pile structure covering at least one opening of the air inlet opening or the air outlet opening, the pile structure including a pile of packing objects covering the at least one opening, such that the at least one opening is obscured from direct exposure to the ambient environment by the pile of the packing objects, the pile structure including a first pile structure covering the air inlet opening, the first pile structure including a first pile of first packing objects covering the air inlet opening, such that the air inlet opening is obscured from direct exposure to the ambient environment by the first pile of the first packing objects; and a second pile structure covering the air outlet opening, the second pile structure including a second pile of second packing objects covering the air outlet opening, such that the air outlet opening is obscured from direct exposure to the ambient environment by the second pile of the second packing objects, the pile structure being one of the first pile structure or the second pile structure, such that the pile of the packing objects is one of the first pile of the first packing objects or the second pile of the second packing objects.

* * * * *

UNITED STATES PATENT AND TRADEMARK OFFICE
CERTIFICATE OF CORRECTION

| | |
|---|---|
| PATENT NO. | : 11,443,859 B2 |
| APPLICATION NO. | : 17/134894 |
| DATED | : September 13, 2022 |
| INVENTOR(S) | : Derek Bass et al. |

It is certified that error appears in the above-identified patent and that said Letters Patent is hereby corrected as shown below:

In the Specification

Column 15, Line 34 should read:
In some example embodiments, at least some of the packing objects 212 may include and or may comprise a polymer matrix (e.g., polyimides, polybenzoxazoles (PBOs), polybenzimidazoles, and polybenzthiazoles (PBTs)) configured to decompose in the presence of heat in order to provide a "blanketing" structure that covers and smothers the potential fire.

Signed and Sealed this
Seventeenth Day of October, 2023

Katherine Kelly Vidal
*Director of the United States Patent and Trademark Office*